(12) United States Patent
Lee

(10) Patent No.: US 12,338,903 B2
(45) Date of Patent: Jun. 24, 2025

(54) ELEVATABLE CHAMBER AND METHOD OF OPERATING THE SAME

(71) Applicant: LG Energy Solution, Ltd., Seoul (KR)

(72) Inventor: Su Ho Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/687,178

(22) PCT Filed: Aug. 2, 2023

(86) PCT No.: PCT/IB2023/057815
§ 371 (c)(1),
(2) Date: Feb. 27, 2024

(87) PCT Pub. No.: WO2024/023809
PCT Pub. Date: Feb. 1, 2024

(65) Prior Publication Data
US 2024/0426386 A1    Dec. 26, 2024

(30) Foreign Application Priority Data

Jul. 26, 2022 (KR) .......................... 10-2022-0092592
Jun. 5, 2023 (KR) .......................... 10-2023-0072044

(51) Int. Cl.
*F16K 17/00* (2006.01)
*F15B 11/044* (2006.01)
(Continued)

(52) U.S. Cl.
CPC ............. *F16K 17/00* (2013.01); *F15B 11/044* (2013.01); *F15B 11/16* (2013.01); *F15B 19/005* (2013.01);
(Continued)

(58) Field of Classification Search
CPC ........ F16K 17/00; F15B 11/044; F15B 11/16; F15B 19/005; F15B 20/00; F15B 20/005; F15B 2211/3059; F15B 2211/327; F15B 2211/329; F15B 2211/40584; F15B 2211/41527; F15B 2211/46; F15B 2211/50518; F15B 2211/50554; F15B 2211/5151; H01M 50/609
(Continued)

(56) References Cited

U.S. PATENT DOCUMENTS 4,803,807 A    2/1989  Stockermann et al.
5,662,021 A *  9/1997  Farmer .................. F16P 3/001
                                                        91/462

(Continued)

FOREIGN PATENT DOCUMENTS

CN        108091818 A      5/2018
EP          1847720 B1    10/2008
(Continued)

*Primary Examiner* — Minh Q Le
(74) *Attorney, Agent, or Firm* — Bryan Cave Leighton Paisner LLP

(57) ABSTRACT

An elevatable chamber and a method of operating the same are provided. The elevatable chamber includes a chamber body, a chamber frame, an air cylinder, and a controller, and is capable of preventing serious injury of a worker caused by being caught in an apparatus and of minimizing damage to the apparatus.

15 Claims, 19 Drawing Sheets

(51) Int. Cl.
  *F15B 11/16* (2006.01)
  *F15B 19/00* (2006.01)
  *F15B 20/00* (2006.01)
  *H01M 50/609* (2021.01)

(52) U.S. Cl.
  CPC ............ *F15B 20/00* (2013.01); *F15B 20/005* (2013.01); *F15B 2211/3059* (2013.01); *F15B 2211/327* (2013.01); *F15B 2211/329* (2013.01); *F15B 2211/40584* (2013.01); *F15B 2211/41527* (2013.01); *F15B 2211/46* (2013.01); *F15B 2211/50518* (2013.01); *F15B 2211/50554* (2013.01); *F15B 2211/5151* (2013.01); *H01M 50/609* (2021.01)

(58) Field of Classification Search
  USPC .................................................. 137/12, 487.5
  See application file for complete search history.

(56) References Cited

U.S. PATENT DOCUMENTS

| | | | | |
|---|---|---|---|---|
| 6,131,500 | A * | 10/2000 | Moncrief | F15B 11/044 91/363 R |
| 2004/0016465 | A1 * | 1/2004 | Wingert | G05D 16/2013 137/625.65 |
| 2009/0071145 | A1 * | 3/2009 | Kim | F15B 11/044 60/459 |
| 2009/0247357 | A1 * | 10/2009 | Doebele | F15B 11/0406 91/361 |
| 2017/0184215 | A1 * | 6/2017 | Junk | F15B 20/00 |
| 2018/0351204 | A1 * | 12/2018 | Kimura | H01M 10/052 |
| 2019/0010965 | A1 * | 1/2019 | Green | F04B 1/04 |
| 2019/0145437 | A1 * | 5/2019 | Fujiwara | F15B 20/00 60/328 |
| 2019/0226937 | A1 | 7/2019 | Glime, III | |
| 2020/0400165 | A1 * | 12/2020 | Klassen | F15B 21/08 |
| 2021/0302259 | A1 | 9/2021 | Glime, III | |
| 2022/0049721 | A1 * | 2/2022 | Oakley | F04B 23/06 |
| 2022/0325728 | A1 * | 10/2022 | Takakuwa | F15B 11/072 |
| 2022/0349426 | A1 * | 11/2022 | Takakuwa | F15B 15/22 |
| 2022/0359916 | A1 * | 11/2022 | Kondo | H01M 50/538 |
| 2023/0174354 | A1 * | 6/2023 | Du | B66F 9/22 254/93 R |
| 2024/0088536 | A1 * | 3/2024 | Shi | H01M 10/04 |
| 2024/0117821 | A1 * | 4/2024 | Johansson | F15B 11/06 |
| 2024/0125666 | A1 | 4/2024 | Glime, III | |
| 2024/0328536 | A1 * | 10/2024 | Mubarak | F16K 31/122 |
| 2025/0075711 | A1 * | 3/2025 | Waßmann | F15B 11/10 |

FOREIGN PATENT DOCUMENTS

| | | |
|---|---|---|
| IT | 20120160 A1 | 2/2014 |
| JP | H09-092264 A | 4/1997 |
| JP | H09-199110 A | 7/1997 |
| JP | 2008-059973 A | 3/2008 |
| KR | 2004-0037461 A | 5/2004 |
| KR | 2004-0070781 A | 8/2004 |
| KR | 2005-0097903 A | 10/2005 |
| KR | 10-0868684 B1 | 11/2008 |
| KR | 2011-0032848 A | 3/2011 |
| KR | 2016-0130646 A | 11/2016 |
| KR | 2019-0049289 A | 5/2019 |
| KR | 2021-0023289 A | 3/2021 |
| WO | 2019-126095 A1 | 6/2019 |
| WO | 2024-128713 A1 | 6/2024 |

* cited by examiner

[FIG. 1]
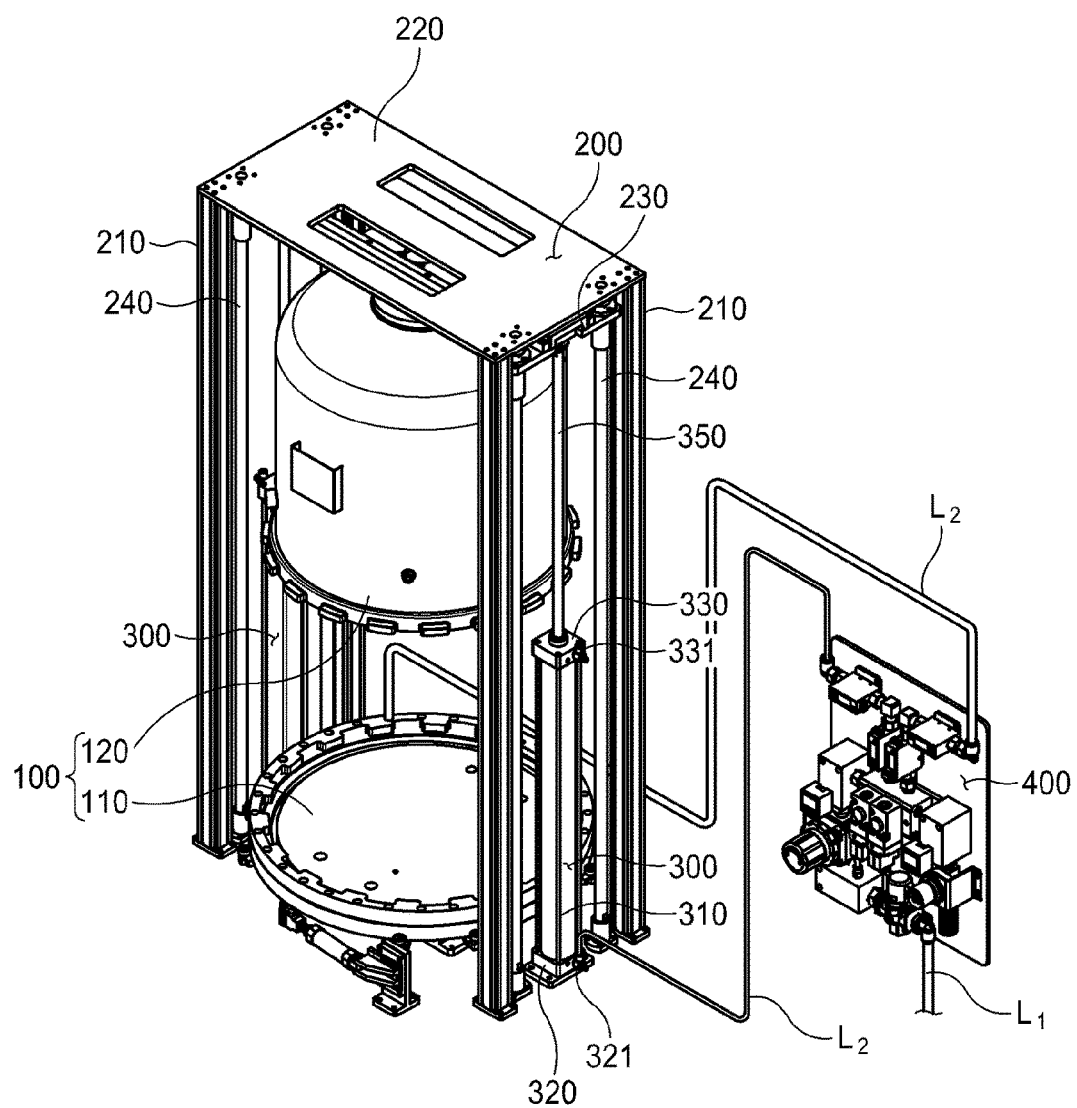

[FIG. 2]
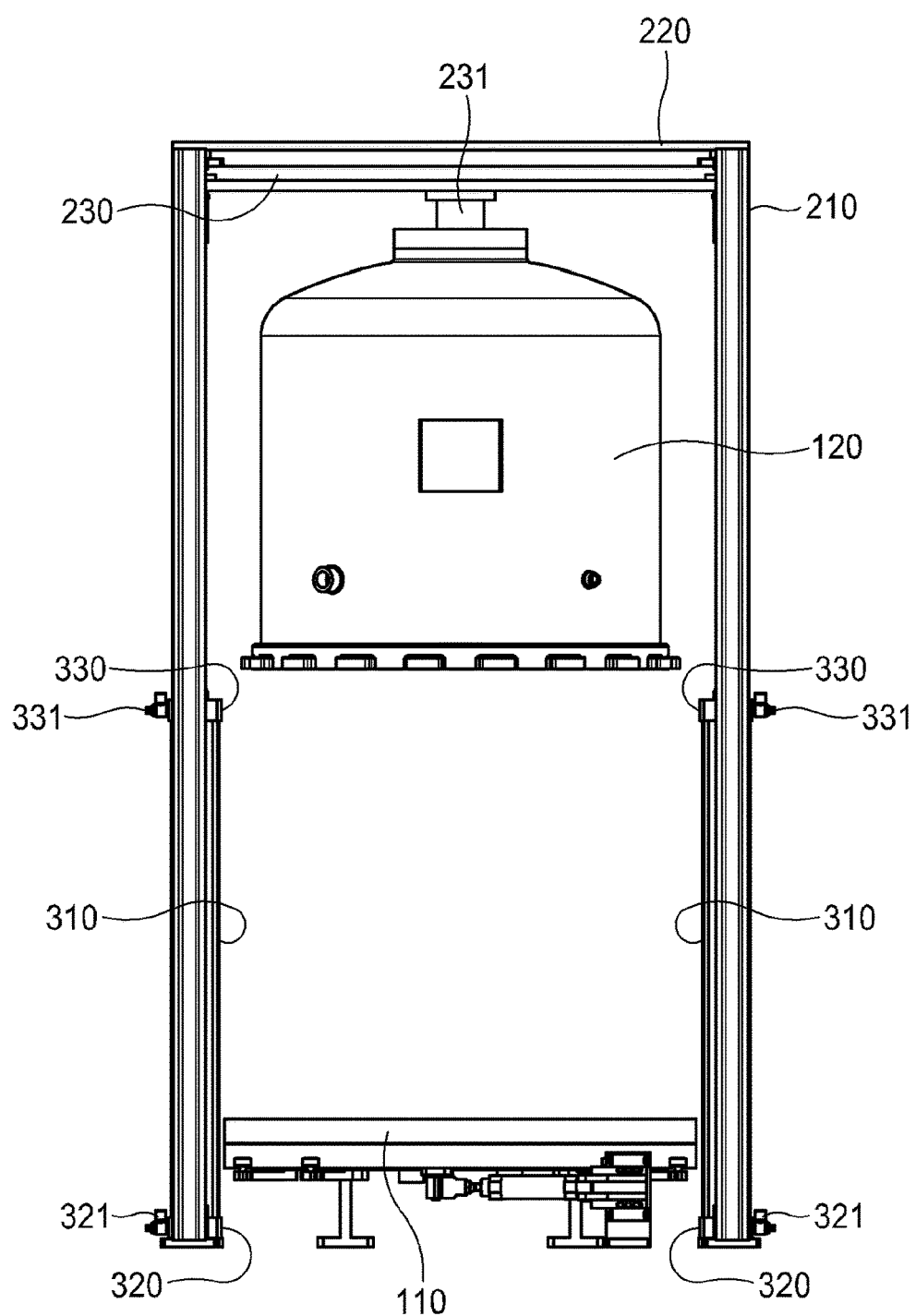

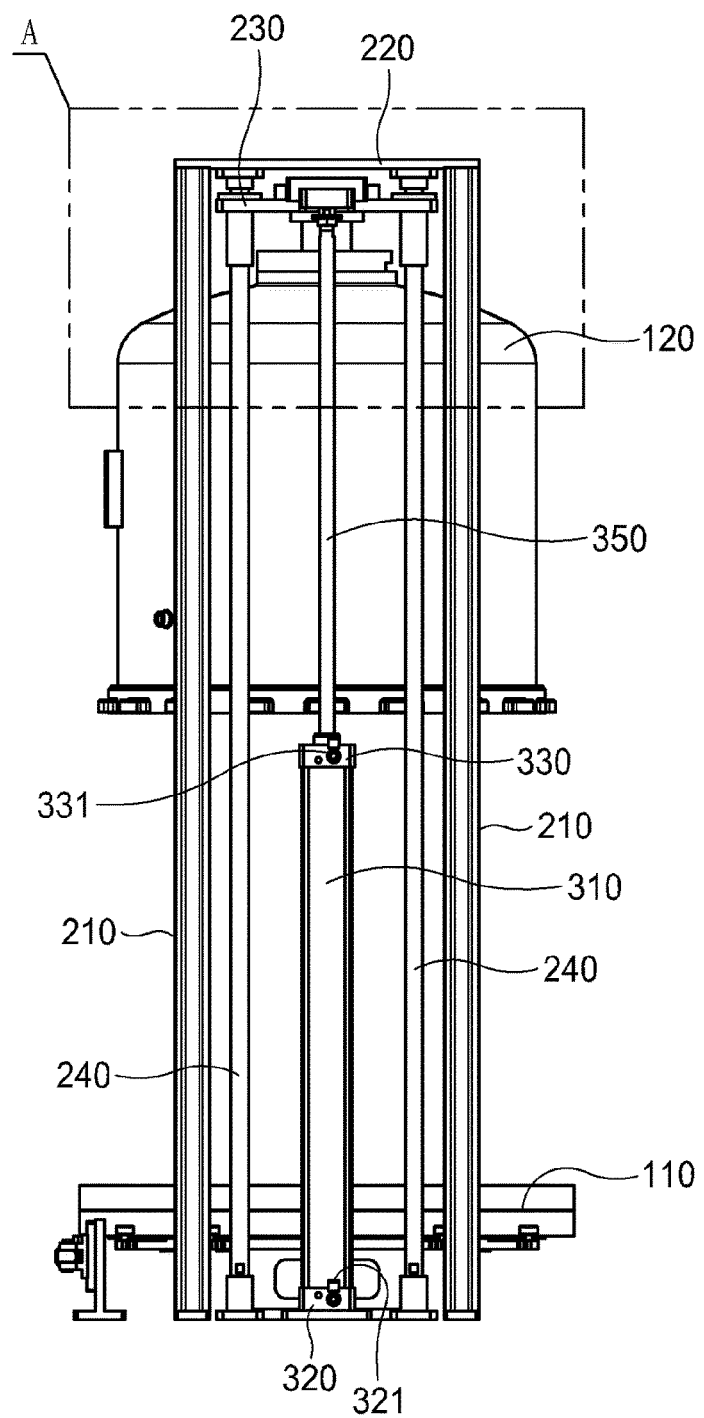
[FIG. 3]

【FIG. 4】
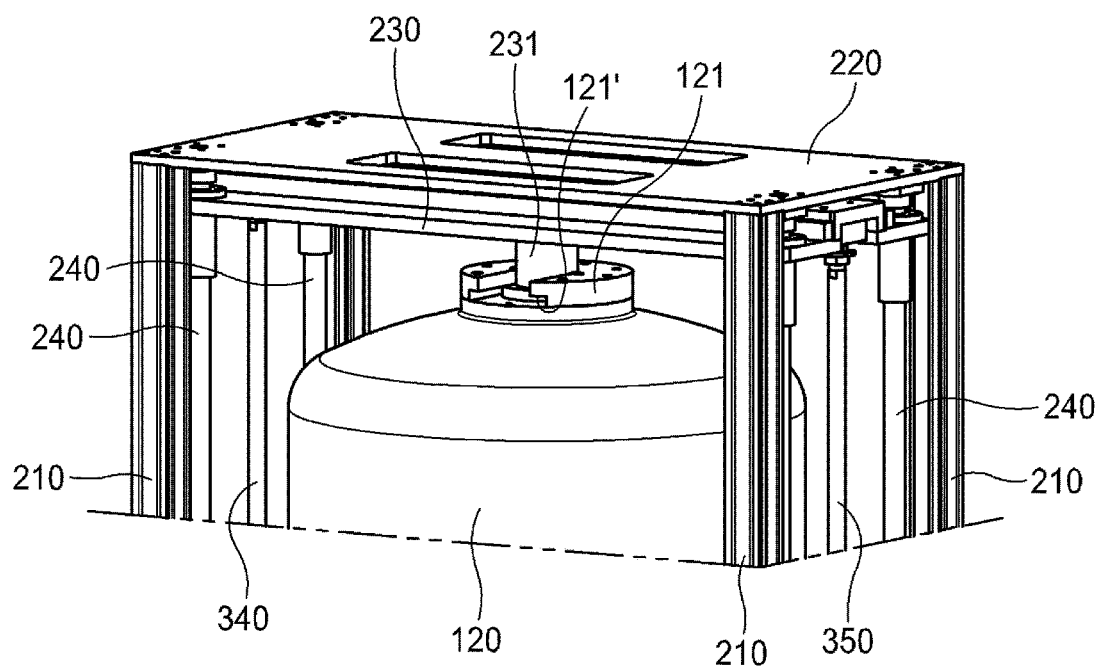

[FIG. 5]
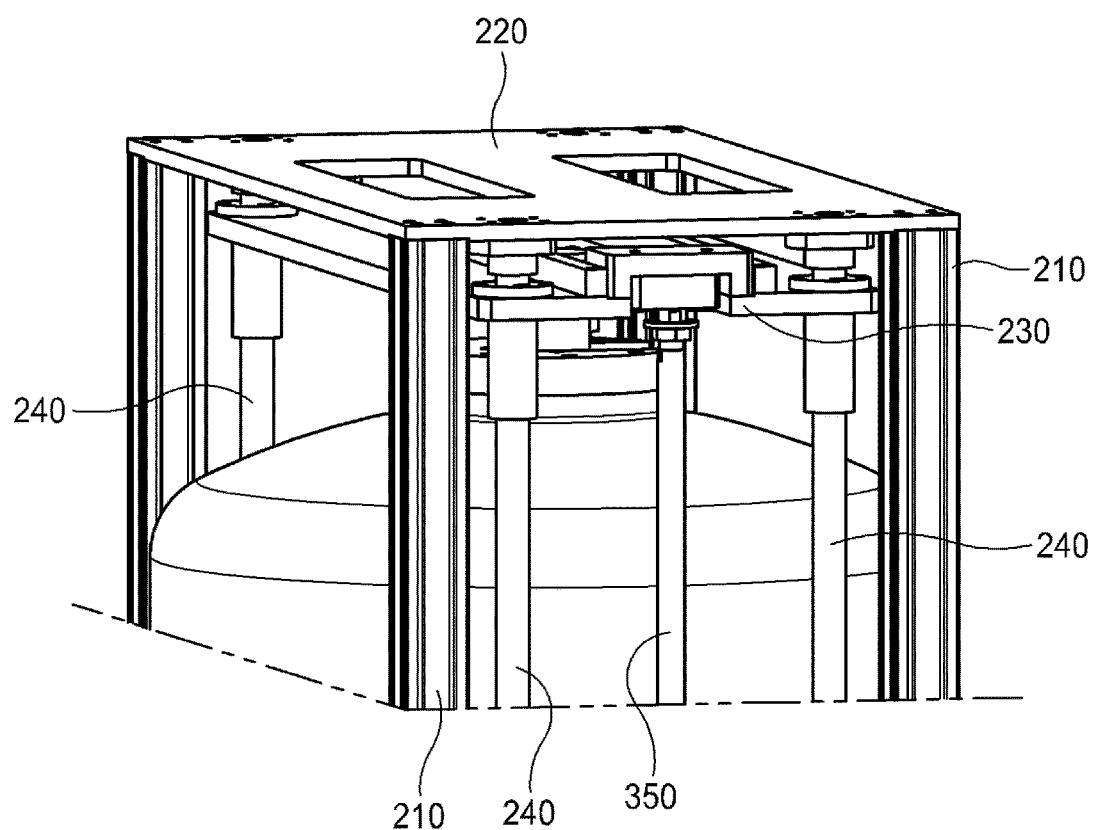

【FIG. 6】
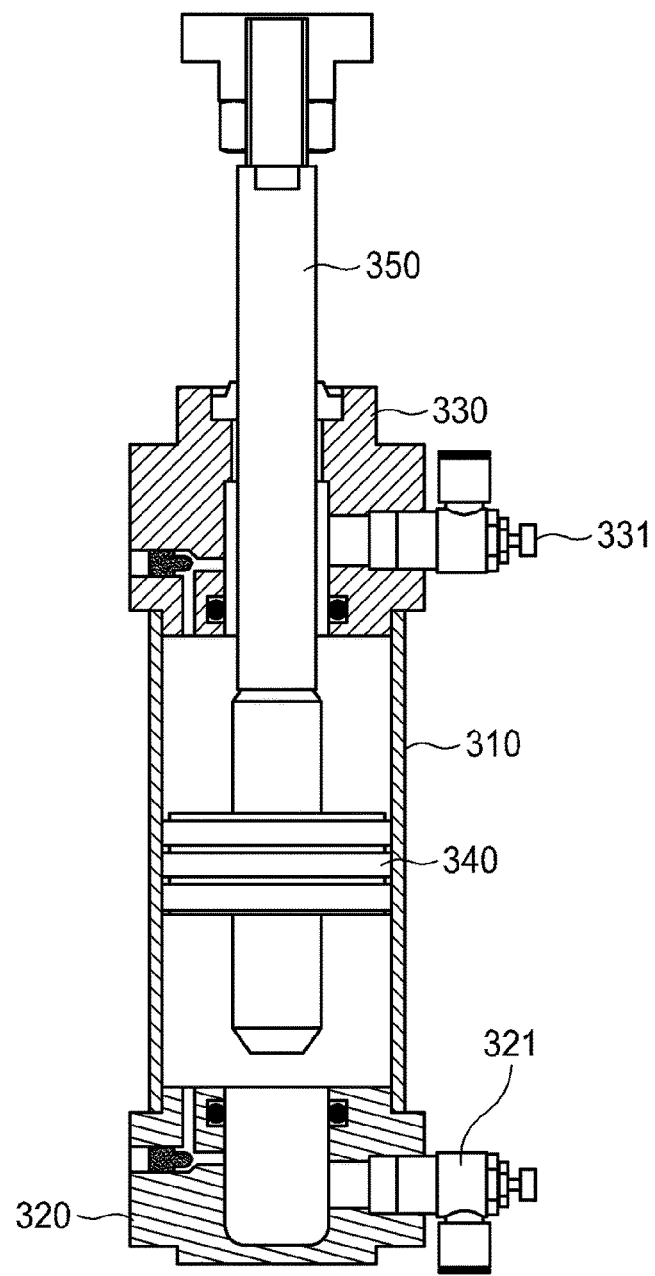

【FIG. 7】
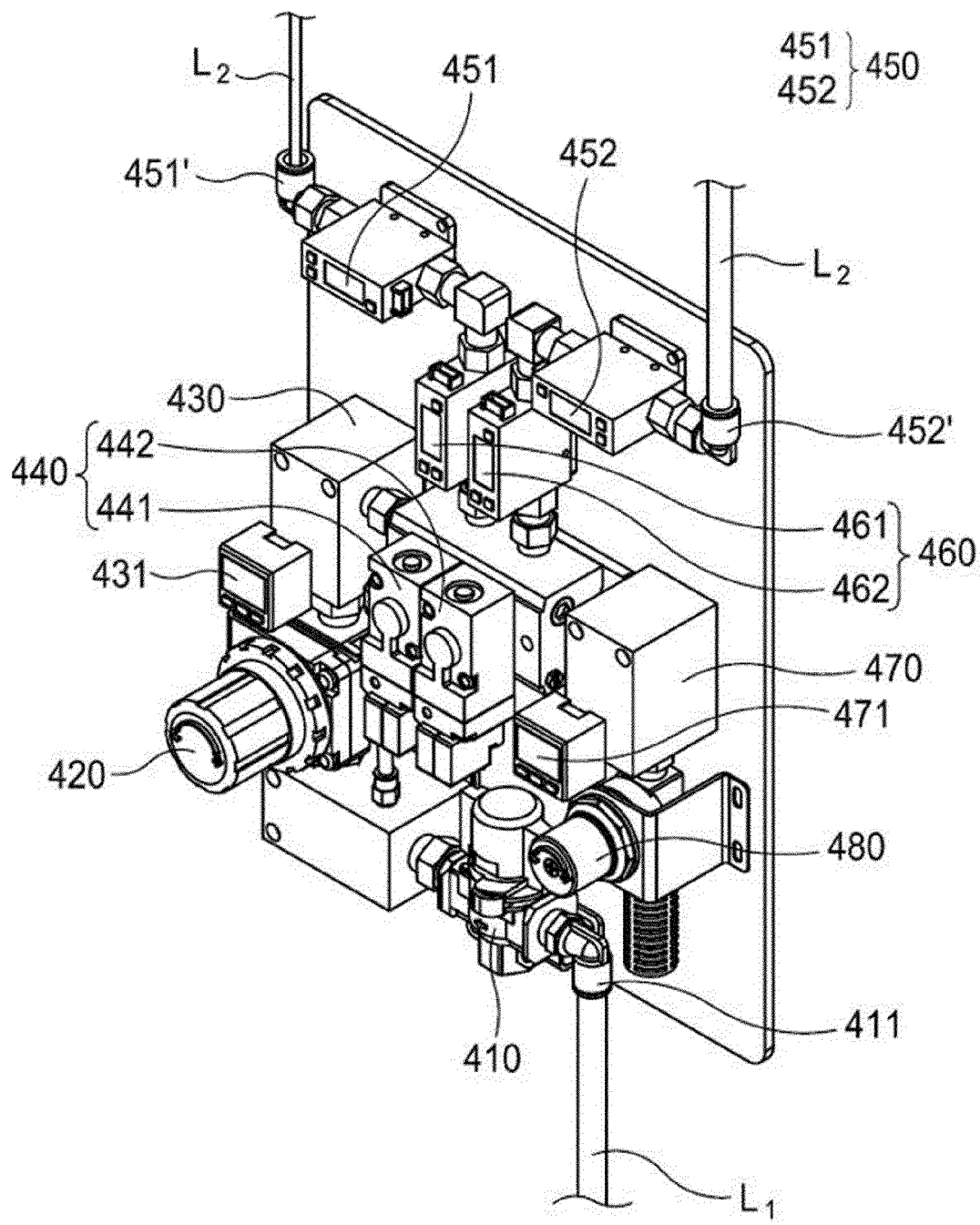

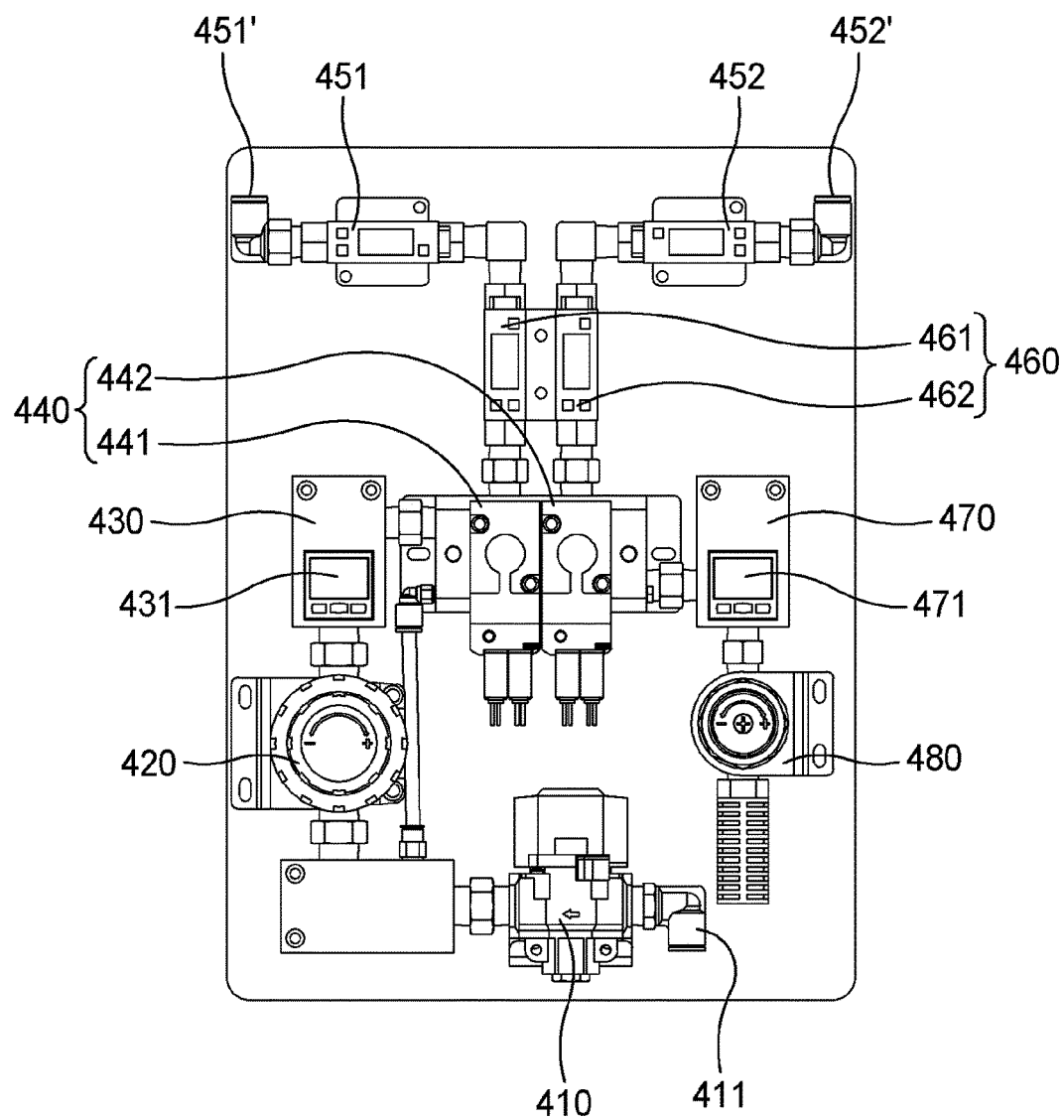
[FIG. 8]

[FIG. 9]
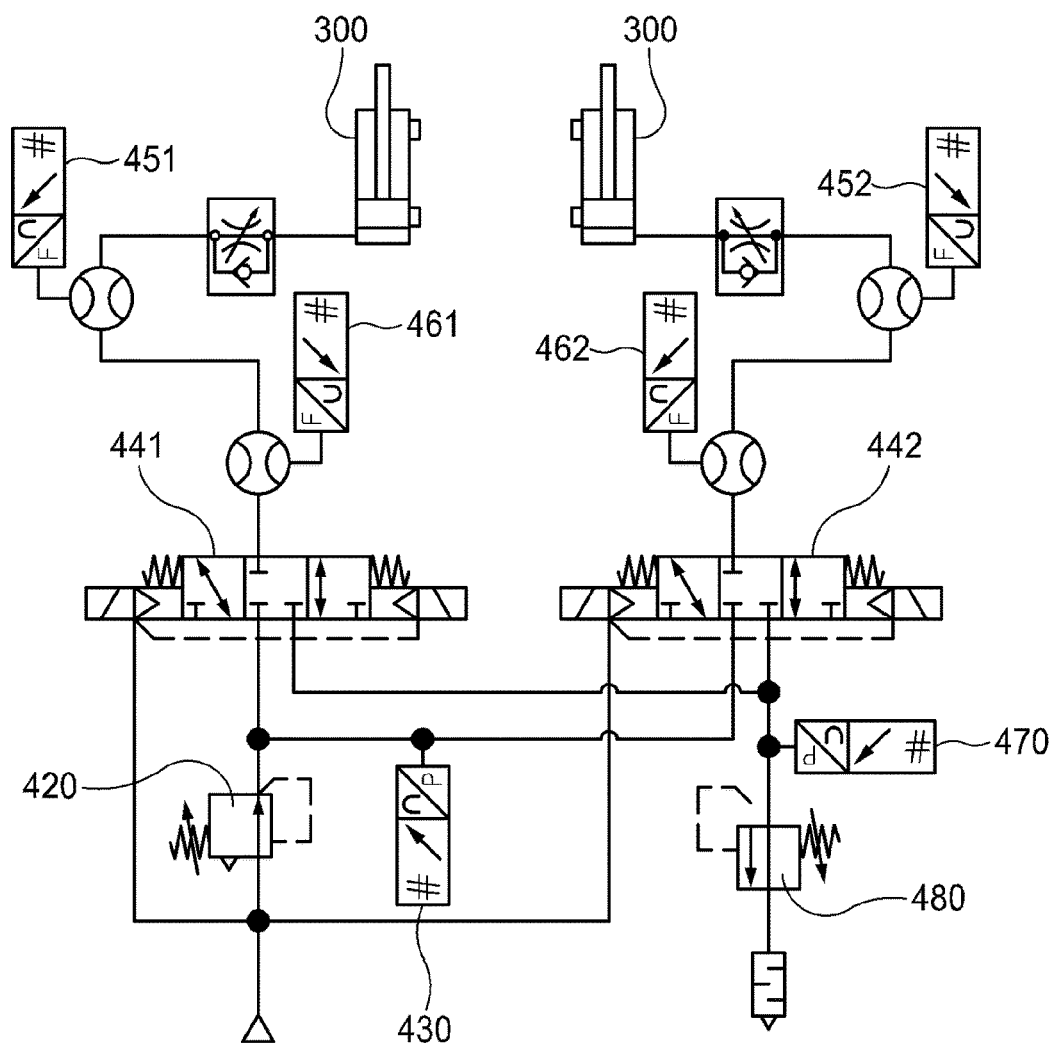

[FIG. 10]
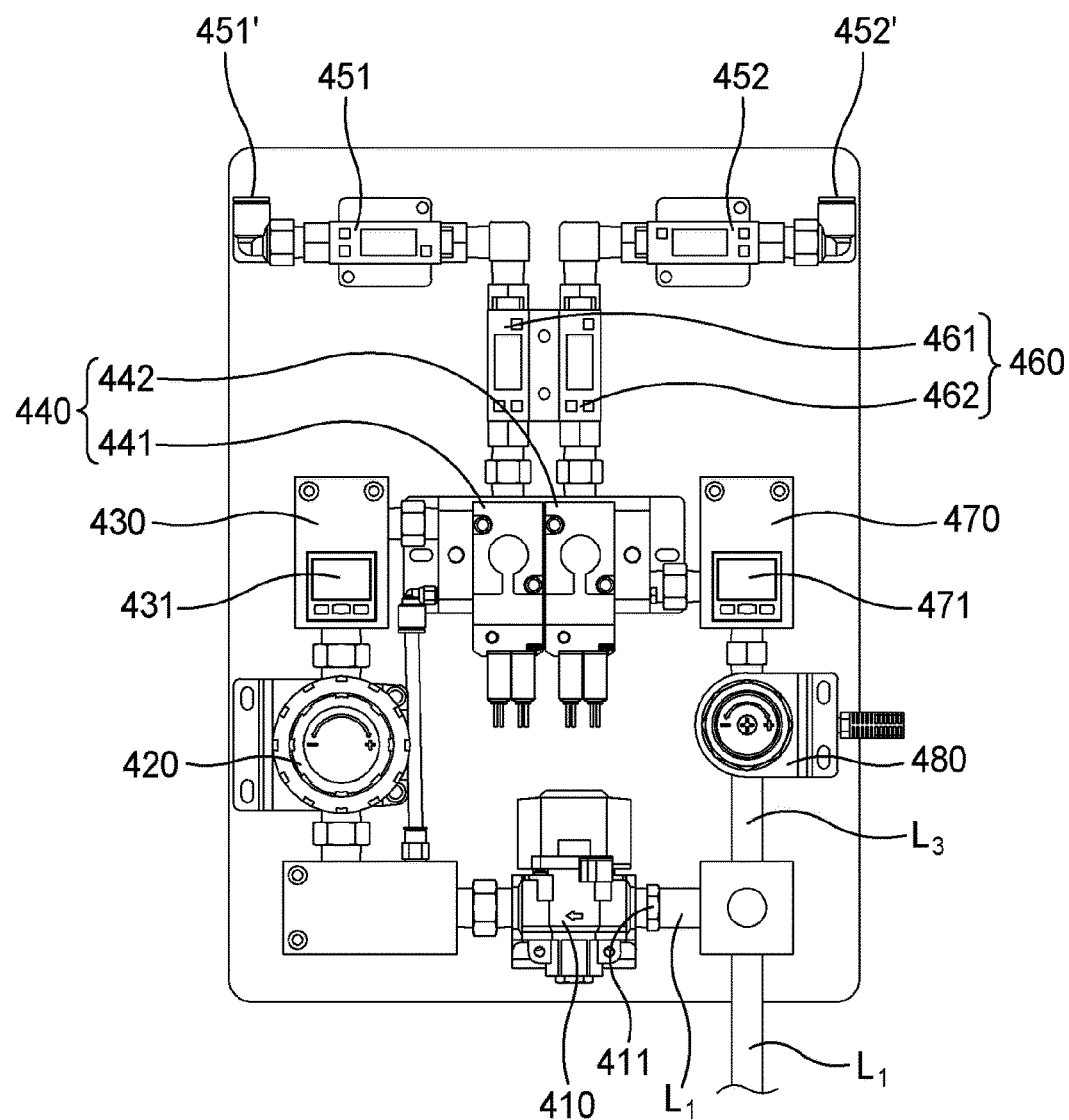

[FIG. 11]
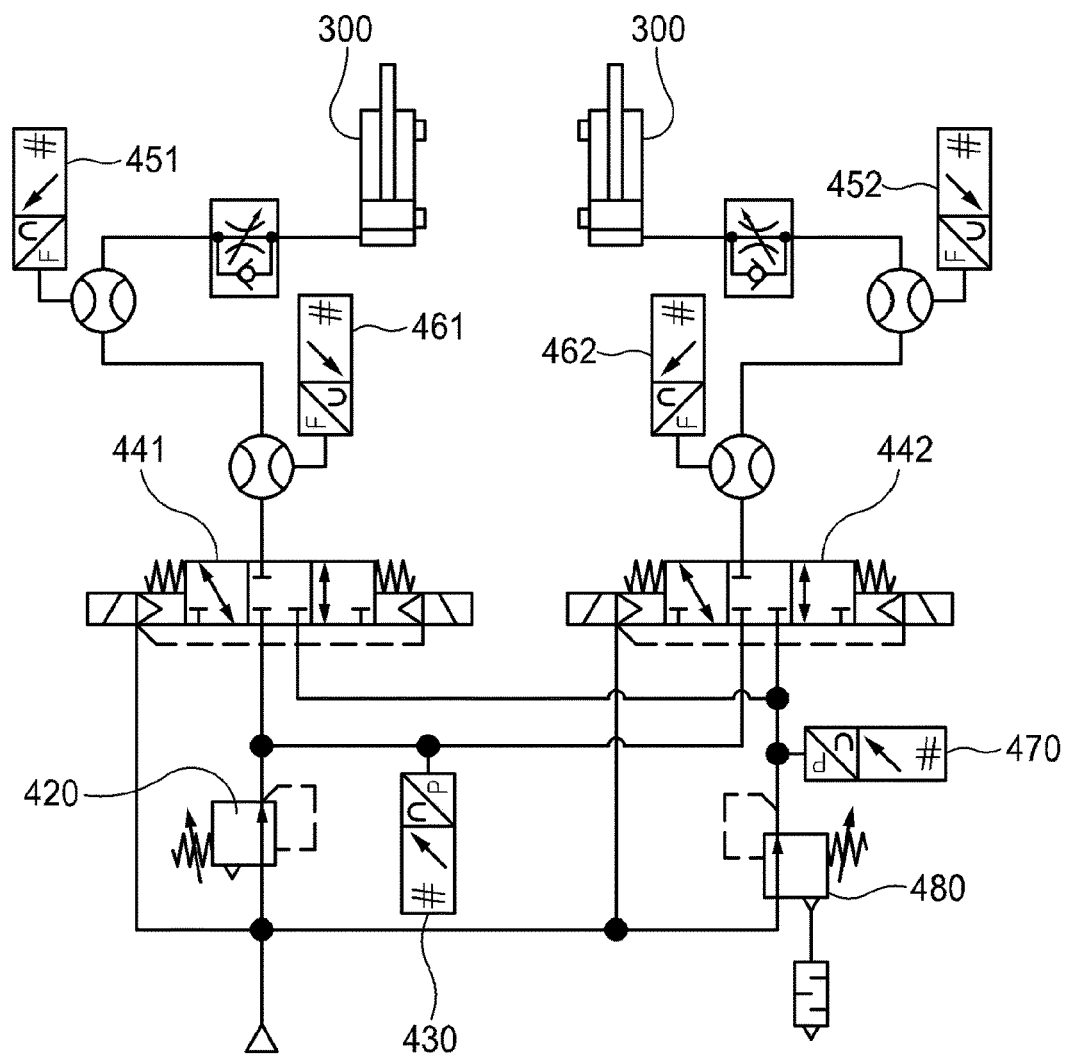

[FIG. 12]
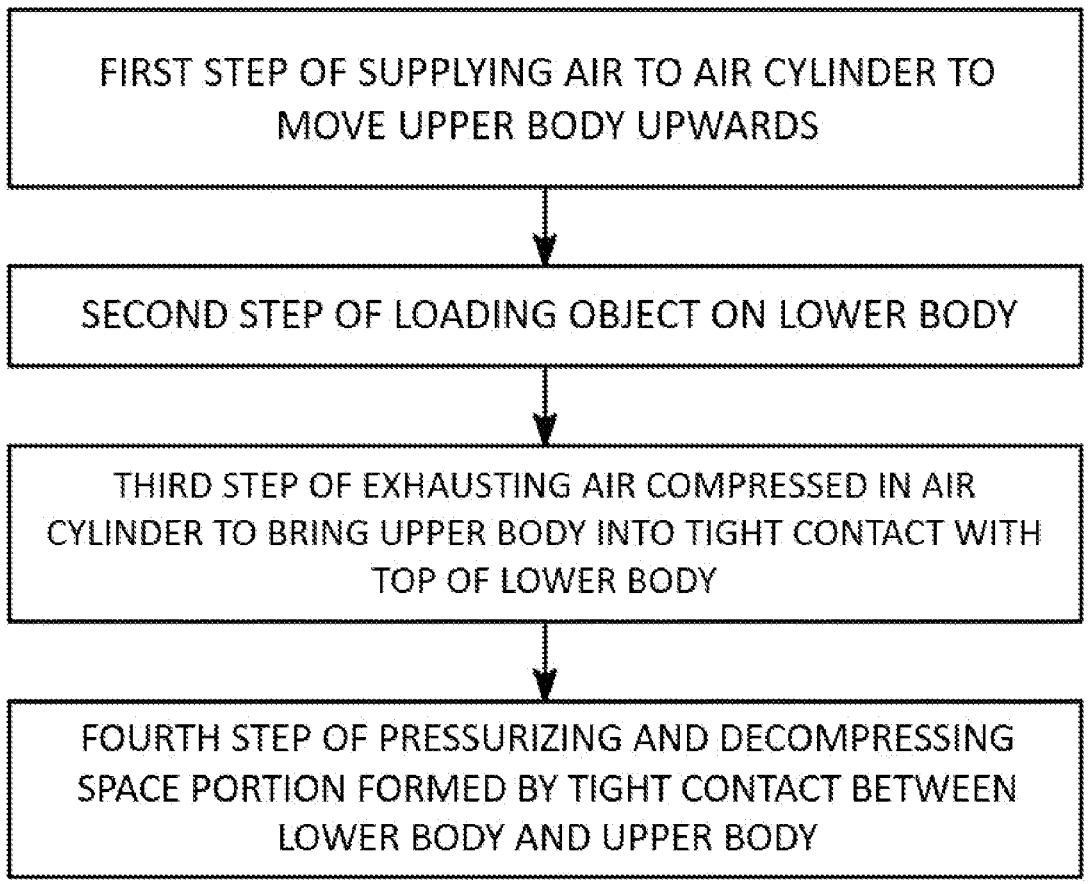

[FIG. 13]
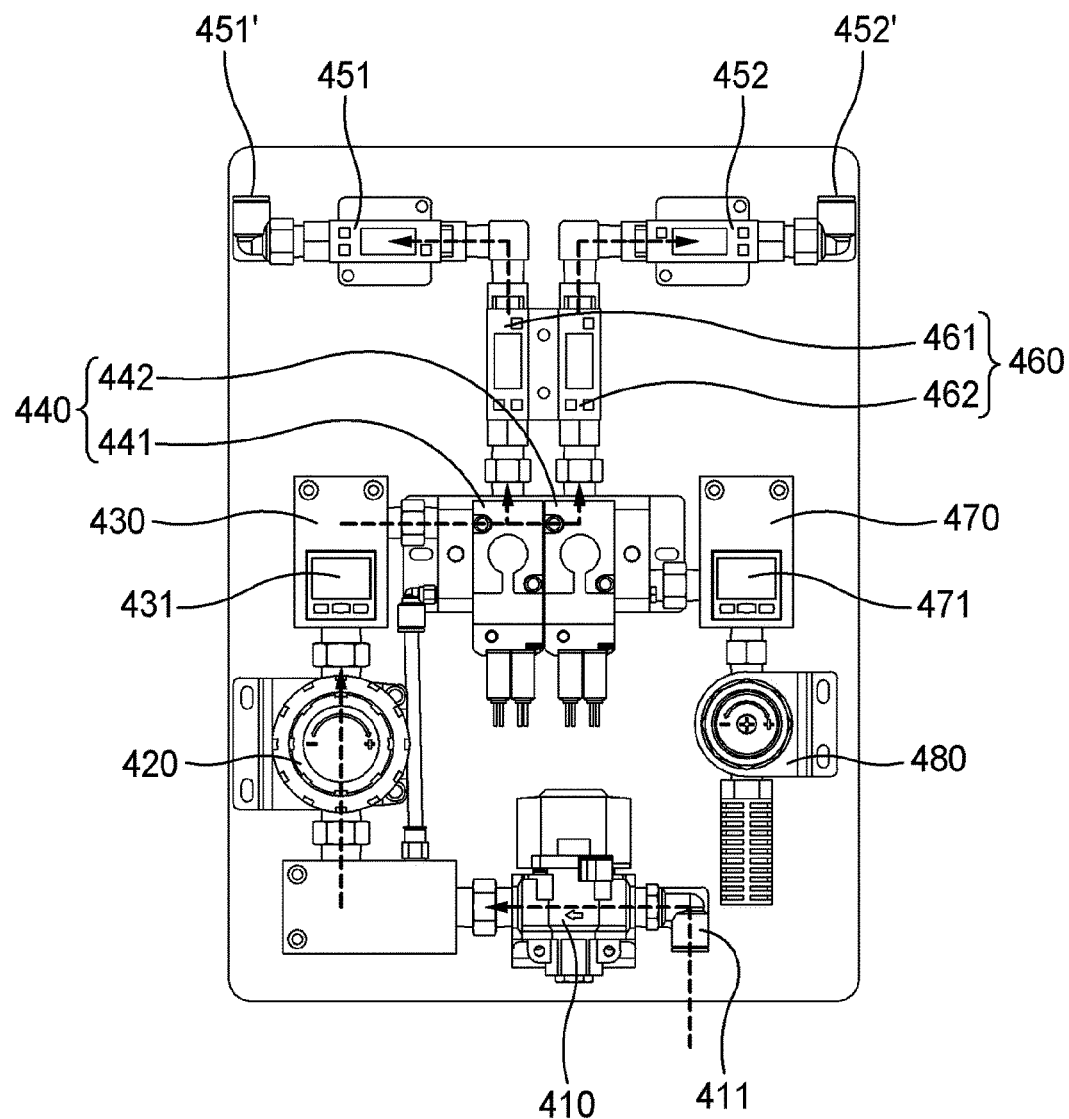

[FIG. 14]
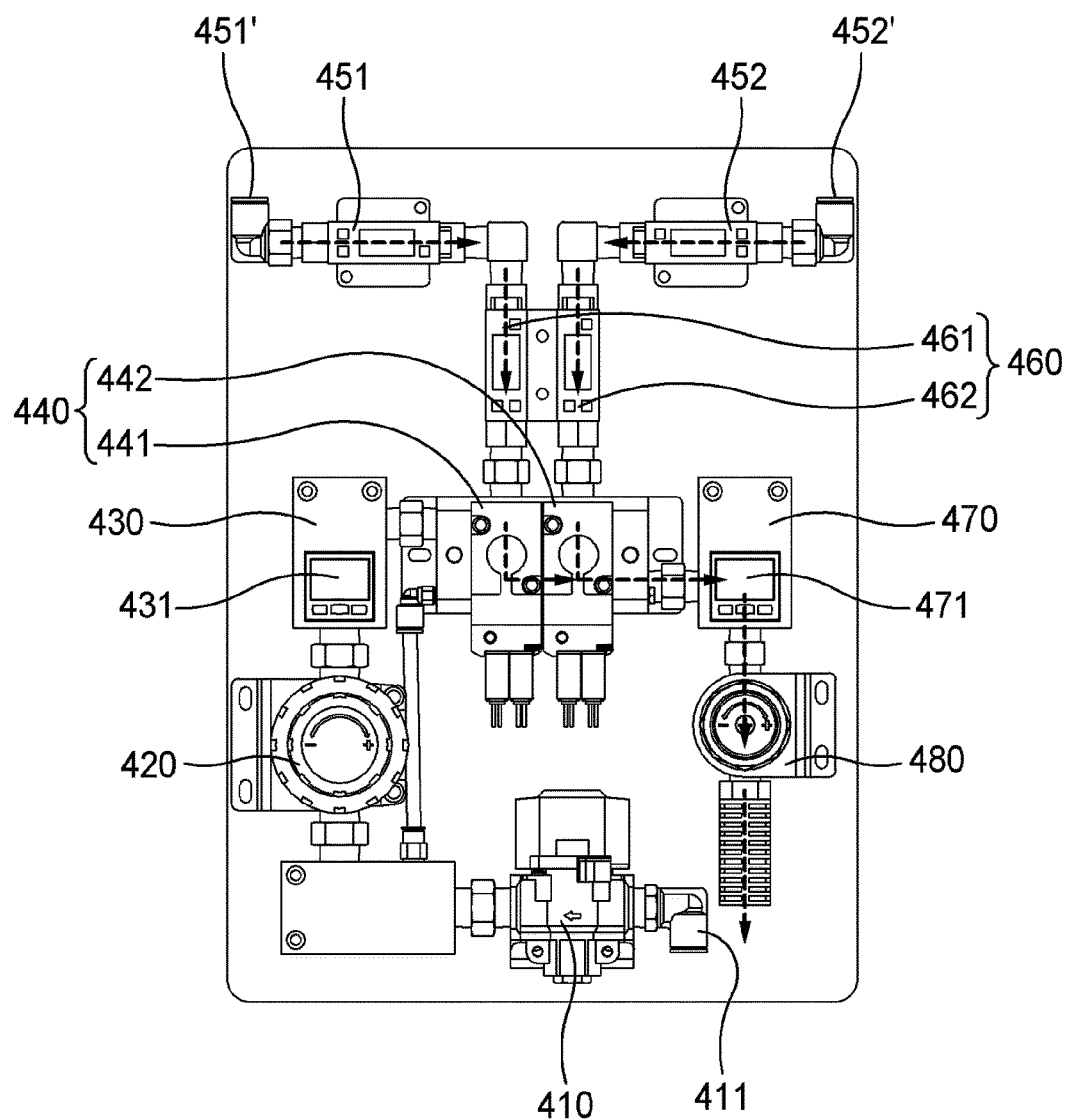

[FIG. 15]
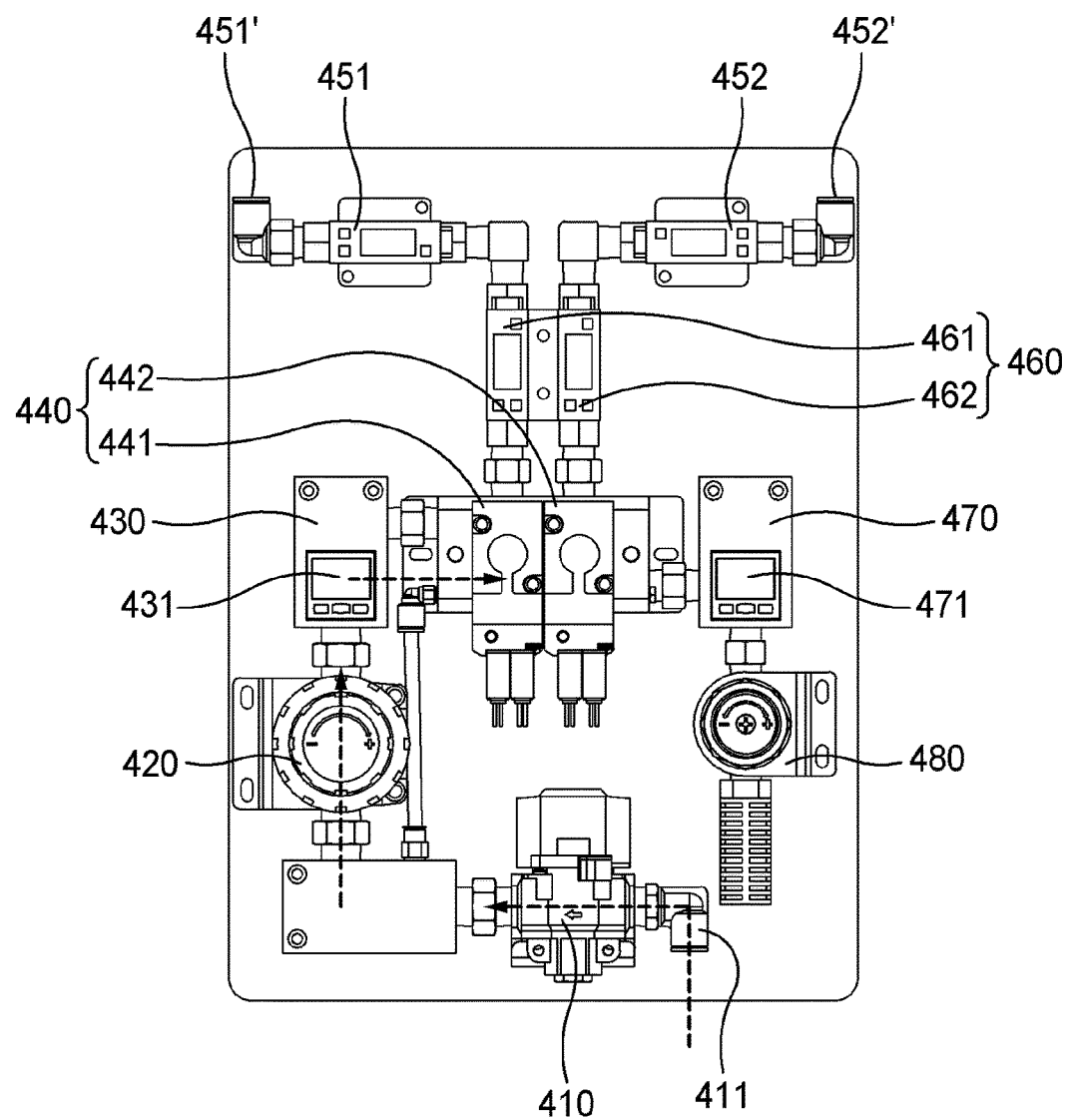

[FIG. 16]
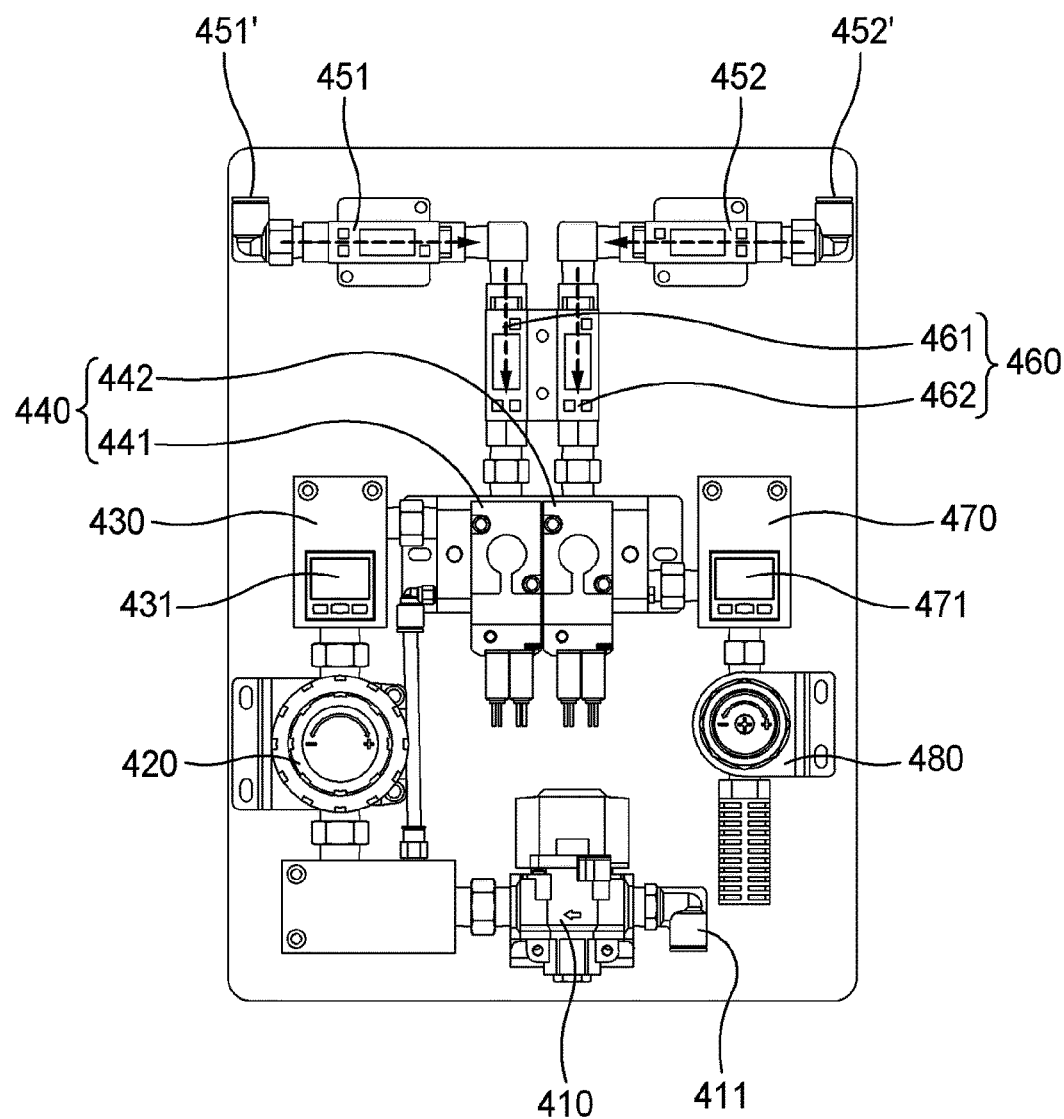

[FIG. 17]
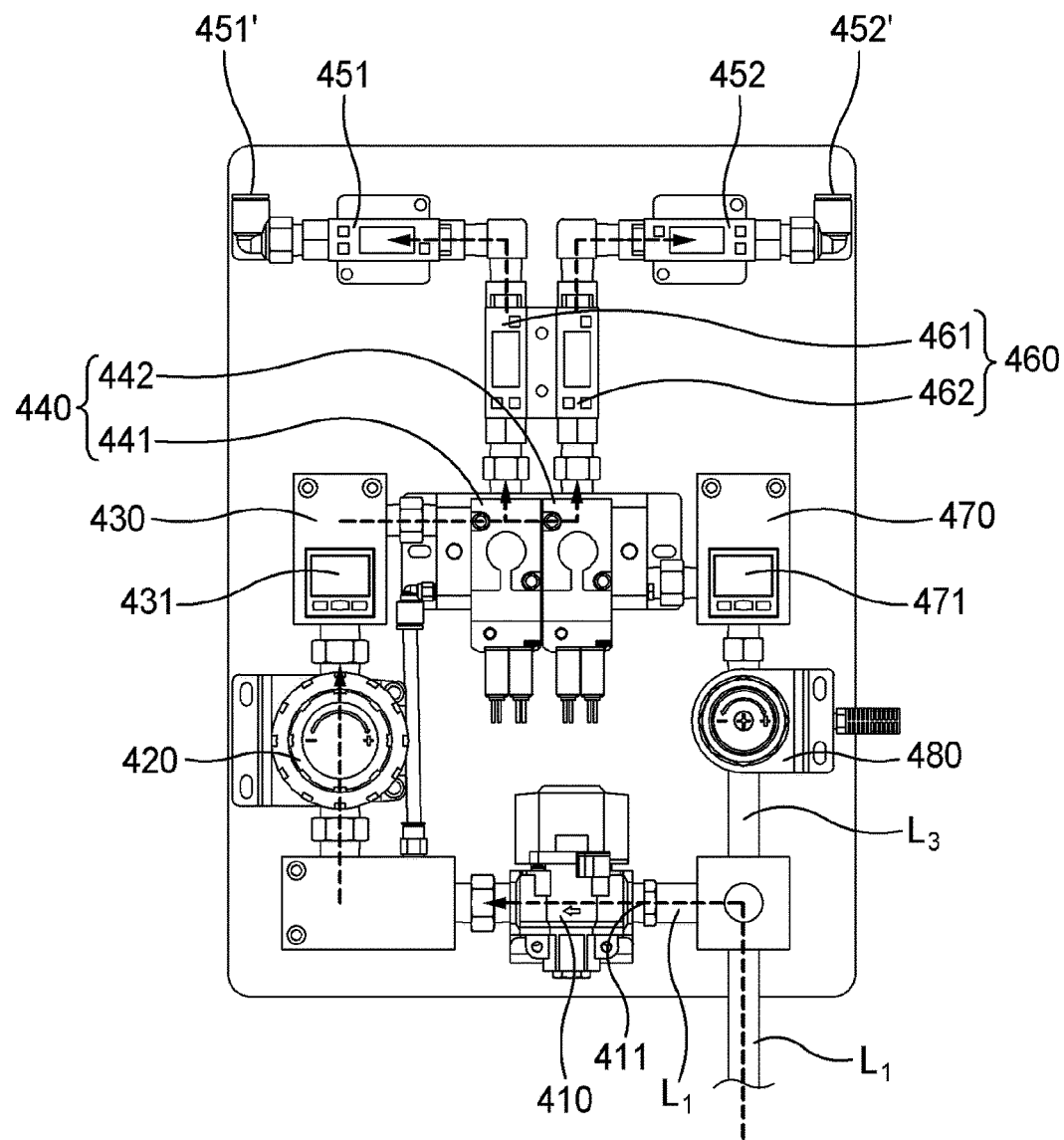

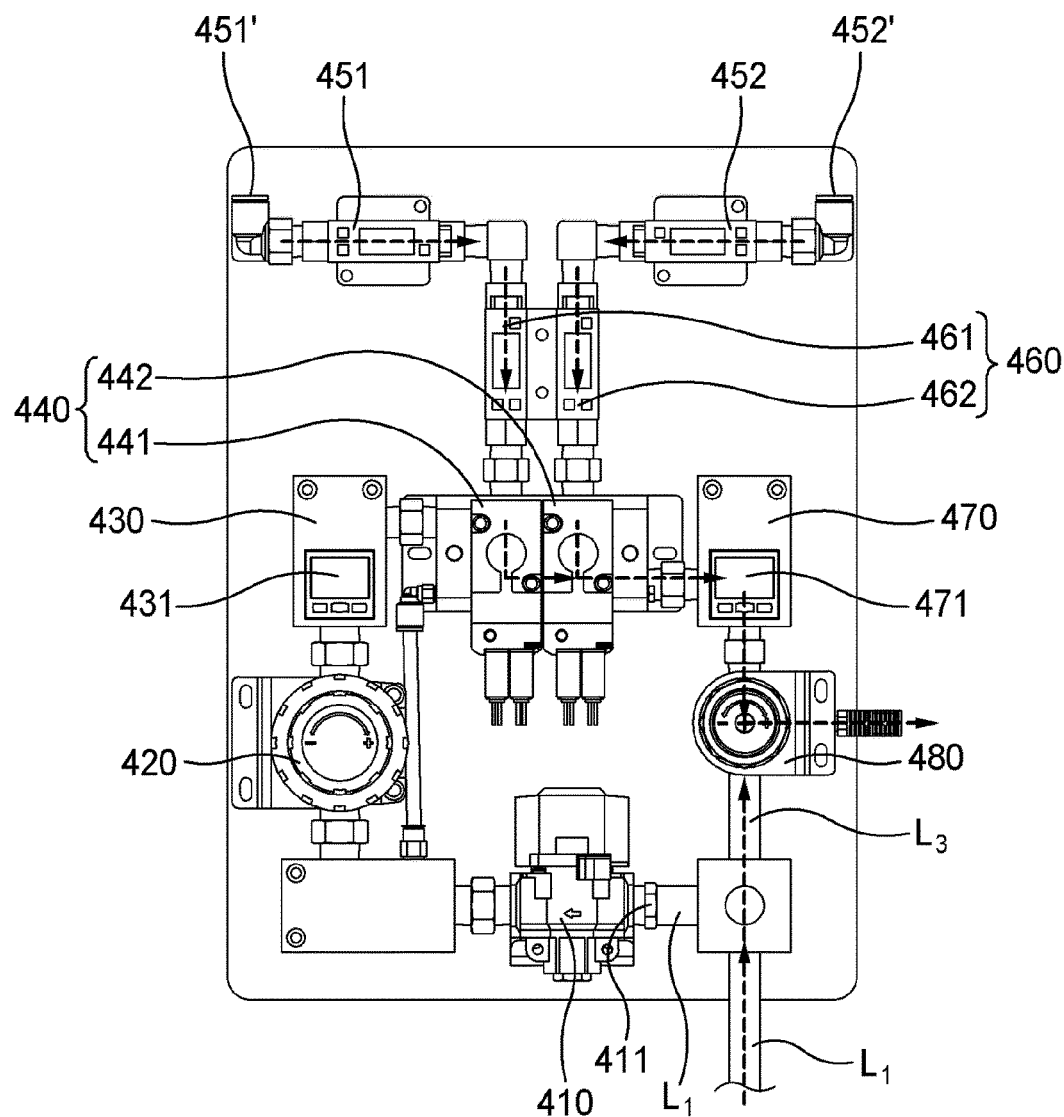
[FIG. 18]

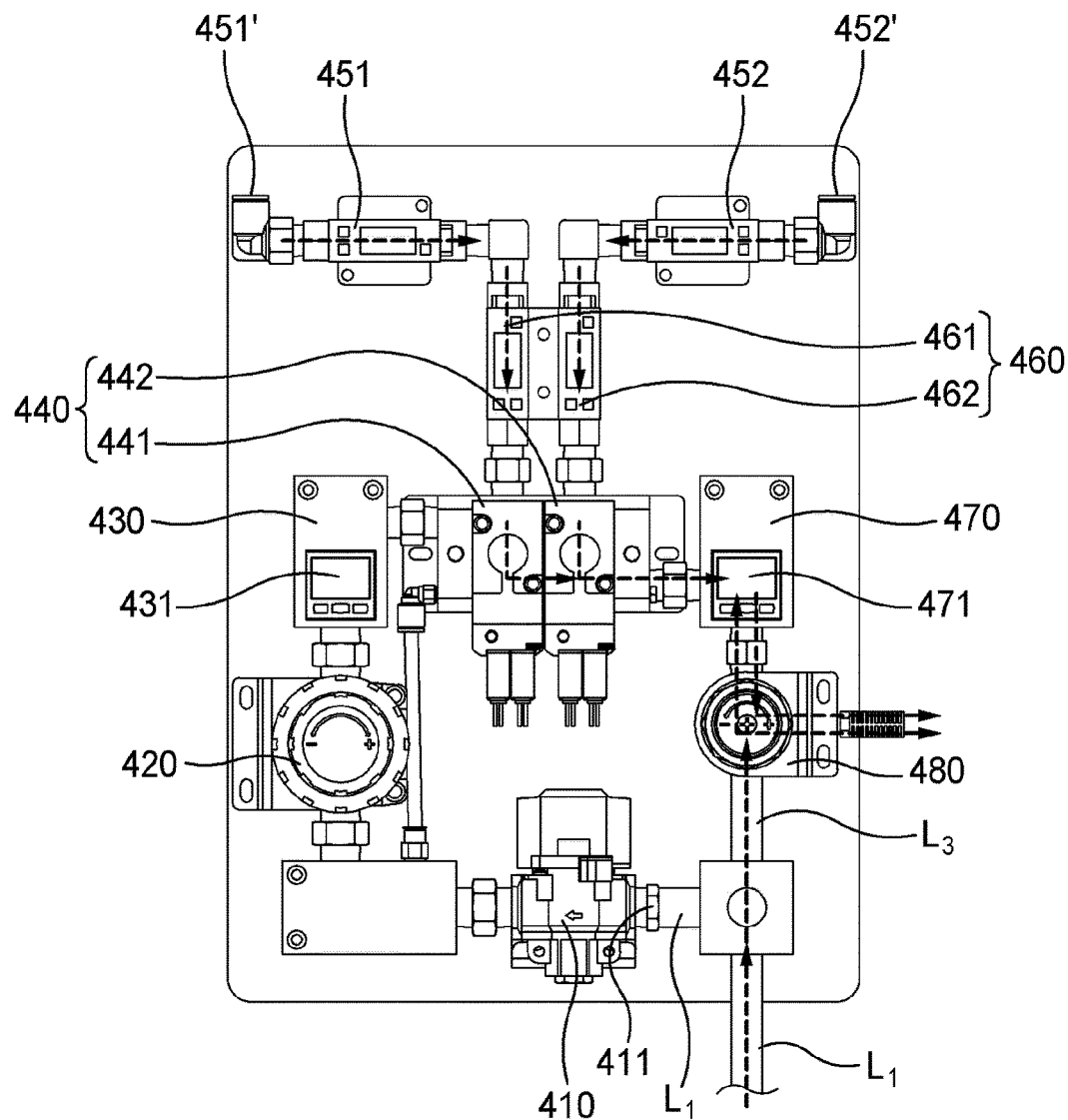
[FIG. 19]

ELEVATABLE CHAMBER AND METHOD OF OPERATING THE SAME

CROSS-REFERENCE TO RELATED APPLICATIONS

This application is a National Phase entry pursuant to 35 U.S.C. § 371 of International Application No. PCT/IB2023/057815, filed on Aug. 2, 2023, and claims the benefit of priority to Korean Patent Application No. 2022-0092592 filed on Jul. 26, 2022 and Korean Patent Application No. 2023-0072044 filed on Jun. 5, 2023, the disclosures of which are incorporated herein by reference in their entirety.

TECHNICAL FIELD

The present disclosure relates to an elevatable chamber and a method of operating the same, and more particularly to an elevatable chamber for impregnation of a secondary battery with an electrolytic solution configured such that, when the chamber is abnormally operated, control is performed such that the chamber is no longer moved through rapid detection thereof, whereby it is possible to guarantee safety of an operator and to prevent damage to an apparatus, and a method of operating the same.

BACKGROUND

With recent development of alternative energies due to air pollution and energy depletion caused as the result of use of fossil fuels, demand for secondary batteries capable of storing electrical energy that is produced has increased. Secondary batteries, which are capable of being charged and discharged, are widely used in various fields, such as mobile devices, electric vehicles, hybrid electric vehicles, and industrial robots.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, based on the shape of a battery case, a lithium secondary battery is classified into a can-shaped secondary battery having an electrode assembly mounted in a metal can or a pouch-shaped secondary battery having an electrode assembly mounted in a pouch made of an aluminum laminate sheet.

A secondary battery is manufactured through a process in which a liquid electrolyte, i.e. an electrolytic solution, is injected in the state in which an electrode assembly constituted by a positive electrode, a negative electrode, and a separator interposed between the positive electrode and the negative electrode is received in a battery case, and the battery case is sealed.

The injected electrolytic solution permeates between the positive electrode plate, the negative electrode plate, and the separator, which constitute the electrode assembly, by capillary force, but impregnation with the electrolytic solution is not easy due to the properties of a porous electrode having a microstructure and physical and chemical properties of components constituting the electrode and the battery.

If impregnation with the electrolytic solution is not sufficient, efficiency of charging and discharging by lithium ions decreases, whereby performance of the secondary battery is deteriorated.

In connection therewith, Korean Patent Application Publication No. 2016-0130646 discloses a method of impregnating a secondary battery with an electrolytic solution, wherein performance of impregnation with an electrolytic solution is improved through a process of pressurization and decompression after an electrolytic solution is supplied to a battery cell.

In addition, Korean Patent Application Publication No. 2011-0032848 discloses a vacuum pressurization chamber constituted by an upper body including a cylindrical body portion, a hemispherical portion extending above the body portion, and a sealing portion extending under the body portion and a disc-shaped lower body corresponding to the upper body.

When a pressurization or decompression process is performed in order to increase the degree of impregnation with an electrolyte solution, as in the prior art documents, a chamber made of metal that can be opened and closed and that has sufficient durability to withstand pressurization or decompression is required.

Since the weight of the chamber is large, however, separate elevating equipment is required for operation, and at this time, an operator may be caught in the equipment due to malfunction of the equipment or carelessness, which may lead to a major accident, such as death.

RELATED ART

Korean Patent Application Publication No. 2016-0130646 (published on Nov. 14, 2016)
Korean Patent Application Publication No. 2011-0032848 (published on Mar. 30, 2011)

SUMMARY

Technical Problem

The present disclosure has been made in view of the above problems, and it is an object of the present disclosure to provide an elevatable chamber configured such that a chamber body constituted by a lower body and an upper body is used for impregnation with an electrolytic solution, and when the operation of the upper body driven by an air cylinder is abnormal, control is performed such that the upper body is no longer moved, whereby it is possible to guarantee safety of an operator, and a method of operating the same.

It is another object of the present disclosure to provide an elevatable chamber configured such that, when an upper body is moved downwards, the weight of the upper body is adjusted by adjusting the pressure of air compressed in an air cylinder, whereby it is possible to prevent damage to the chamber and furthermore to improve a working environment, and a method of operating the same.

Technical Solution

In order to accomplish the above objects, an elevatable chamber according to the present disclosure includes a chamber body (100) constituted by a lower body (110) and an upper body (120) located above the lower body (110), a chamber frame (200) including a pair of vertical frames (210) located so as to face each other with the chamber body (100) disposed therebetween, a horizontal frame (220) connecting upper parts of the pair of vertical frames (210) to each other, and a support plate (230) located under the horizontal frame (220) and configured to move upwards and downwards with the upper body (120) fastened thereto, an air cylinder (300) including a cylinder tube (310) having a cylindrical shape located in the vicinity of each of the pair of vertical frames (210), a head cover (320) configured to seal a head-side end of the cylinder tube (310) and having a head-side port (321) configured to allow air to be introduced therethrough when the support plate (230) is moved upwards and to allow air to be exhausted therethrough when the support plate is moved downwards, a rod cover (330) configured to seal a rod shaft end of the cylinder tube (310) and having a rod-side port (331) configured to remain open, a piston (340) configured to divide a cylinder chamber of the cylinder tube (310), and a piston rod (350) having one side connected to the piston (340) and the other end connected to the support plate (230), and a controller (400) including a supply pressure control member (420) configured to supply air to the cylinder tube (310) such that the support plate (230) is moved upwards, a first pressure sensor (430) located in front of the supply pressure control member (420), a pair of supply flow sensors (450) located in front of the first pressure sensor (430), a pair of exhaust flow sensors (460) configured to exhaust air from the cylinder tube (310) when the support plate (230) is moved downwards, a second pressure sensor (470) located in front of the exhaust flow sensors (460), and an exhaust pressure control member (480) located in front of the second pressure sensor (470), wherein the exhaust pressure control member (480) performs control such that air in the cylinder tube (310) is exhausted while being maintained at a predetermined pressure.

Also, in the elevatable chamber according to the present disclosure, the exhaust pressure control member (480) may be a regulator having an inlet port configured to allow air to be supplied therethrough, a connection port configured to communicate with the second pressure sensor (470), and an exhaust port configured to allow air to be exhausted therethrough.

Also, in the elevatable chamber according to the present disclosure, the exhaust pressure control member (480) may be a relief valve.

Also, the elevatable chamber according to the present disclosure may further include a pilot valve (440) configured to block the supply or exhaust of air, thereby stopping movement of the piston rod (350), when a value measured by one or more of the first pressure sensor (430), the supply flow sensor (450), the exhaust flow sensor (460), and the second pressure sensor (470) deviates from a predetermined range.

Also, in the elevatable chamber according to the present disclosure, a main valve (410) having an air inlet port (411) configured to allow air to be supplied therethrough may be connected to the rear of the supply pressure control member (420).

Also, in the elevatable chamber according to the present disclosure, the exhaust flow sensor (460) may be located between the first pressure sensor (430) and the supply flow sensor (450), and each of the supply flow sensor (450) and the exhaust flow sensor (460) may be a unidirectional flow sensor such that the supply flow sensor (450) may sense the flow rate of air when the air is supplied while the exhaust flow sensor (460) may sense the flow rate of air when the air is exhausted.

Also, in the elevatable chamber according to the present disclosure, the exhaust flow sensor (460) may be located between the second pressure sensor (470) and the supply flow sensor (450).

Also, in the elevatable chamber according to the present disclosure, a pilot valve (440) configured to switch the movement direction of air may be provided between the first pressure sensor (430), the exhaust flow sensor (460), and the second pressure sensor (470).

Also, in the elevatable chamber according to the present disclosure, the pilot valve (440) may be an intermediate stop type solenoid valve configured to block the supply or exhaust of air, thereby stopping movement of the piston rod (350), when a value measured by one or more of the first pressure sensor (430), the supply flow sensor (450), the exhaust flow sensor (460), and the second pressure sensor (470) deviates from a predetermined range.

Also, in the elevatable chamber according to the present disclosure, when the value measured by the one or more of the first pressure sensor, the supply flow sensor, the exhaust flow sensor, and the second pressure sensor deviates from the predetermined range and is maintained for a certain period of time, the supply or exhaust of air may be blocked, whereby the movement of the piston rod (350) may be stopped.

Also, the elevatable chamber according to the present disclosure may further include a warning portion configured to inform of an abnormal state when a value measured by one or more of the first pressure sensor (430), the supply flow sensor (450), the exhaust flow sensor (460), and the second pressure sensor (470) deviates from a predetermined range.

Also, in the elevatable chamber according to the present disclosure, the upper body (120) may be hemispherical or semi-elliptical in shape, and the lower body (110) and the upper body (120) may be hermetically sealed when being brought into tight contact with each other.

Also, the elevatable chamber according to the present disclosure may be configured to impregnate a secondary battery with an electrolytic solution injected thereinto.

In addition, a method of operating an elevatable chamber according to the present disclosure includes a first step of supplying air to an air cylinder to move an upper body upwards, a second step of loading an object on a lower body, a third step of exhausting air compressed in the air cylinder to bring the upper body into tight contact with the top of the lower body, and a fourth step of pressurizing and decompressing a space portion formed as the result of tight contact between the lower body and the upper body, wherein, in the third step, control is performed such that the compressed air is exhausted while being maintained at a predetermined pressure.

Also, in the method according to the present disclosure, when one or more of the supply flow rate of air or the supply pressure of air in the first step, or the exhaust flow rate of air or the exhaust pressure of air in the third step deviates from a predetermined range, the supply or exhaust of air may be blocked, whereby the operation of the air cylinder may be stopped.

Advantageous Effects

As is apparent from the above description, an elevatable chamber according to the present disclosure and a method of operating the same have a merit in that an intermediate stop type solenoid valve is provided to block the supply or exhaust of air in order to prevent further movement of an upper body when the pressure or the flow rate of air supplied to or exhausted from an air cylinder deviates from a predetermined range, whereby it is possible to prevent an accident, such as death or serious injury, caused as the result of an operator being caught in an apparatus.

In addition, the elevatable chamber according to the present disclosure and the method of operating the same have an advantage in that an exhaust pressure control member is provided to exhaust the air compressed in the air cylinder while being maintained at a predetermined pressure, whereby it is possible to control the downward movement speed of the upper body, which ultimately contributes to guaranteeing safety of the operator and furthermore preventing damage to the chamber.

BRIEF DESCRIPTION OF DRAWINGS

FIG. 1 is a perspective view of an elevatable chamber according to a first preferred embodiment of the present disclosure.

FIG. 2 is a front view of the elevatable chamber according to the first preferred embodiment of the present disclosure.

FIG. 3 is a side view of the elevatable chamber according to the first preferred embodiment of the present disclosure.

FIG. 4 is an enlarged perspective view showing part A of FIG. 3.

FIG. 5 is an enlarged perspective view showing part A of FIG. 3 when viewed in another direction.

FIG. 6 is a sectional view of an air cylinder provided in the elevatable chamber according to the first embodiment.

FIG. 7 is a perspective view of a controller provided in the elevatable chamber according to the first embodiment.

FIG. 8 is a front view of the controller provided in the elevatable chamber according to the first embodiment.

FIG. 9 is an air circuit diagram for operation of an air cylinder according to a first embodiment.

FIG. 10 is a front view of a controller provided in an elevatable chamber according to a second embodiment of the present disclosure.

FIG. 11 is an air circuit diagram for operation of an air cylinder according to a second embodiment of the present disclosure.

FIG. 12 is a flowchart showing a method of operating the elevatable chamber according to each of the first and second embodiments of the present disclosure.

FIG. 13 is a front view of a controller according to a first embodiment, illustrating the flow direction of air when the air is supplied to the air cylinder in a normal state.

FIG. 14 is a front view of the controller according to the first embodiment, illustrating the flow direction of air when the air is exhausted from the air cylinder in a normal state.

FIG. 15 is a front view of the controller according to the first embodiment, illustrating the flow direction of air supplied to the air cylinder in an abnormal state.

FIG. 16 is a front view of the controller according to the first embodiment, illustrating the flow direction of air exhausted from the air cylinder in an abnormal state.

FIG. 17 is a front view of a controller according to a second embodiment, illustrating the flow direction of air when the air is supplied to the air cylinder in a normal state.

FIG. 18 is a front view of the controller according to the second embodiment, illustrating the flow direction of air when the air is exhausted from the air cylinder in a normal state.

FIG. 19 is a front view of the controller according to the second embodiment, illustrating the flow direction of air exhausted from the air cylinder in an abnormal state.

DETAILED DESCRIPTION

Now, preferred embodiments of the present disclosure will be described in detail with reference to the accompanying drawings such that the preferred embodiments of the present disclosure can be easily implemented by a person having ordinary skill in the art to which the present disclosure pertains. In describing the principle of operation of the preferred embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations. In the case in which one part is to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an elevatable chamber according to the present disclosure and a method of operating the same will be described with reference to the accompanying drawings.

FIG. 1 is a perspective view of an elevatable chamber according to a first preferred embodiment of the present disclosure, FIG. 2 is a front view of the elevatable chamber according to the first preferred embodiment of the present disclosure, and FIG. 3 is a side view of the elevatable chamber according to the first preferred embodiment of the present disclosure.

In addition, FIG. 4 is an enlarged perspective view showing part A of FIG. 3, and FIG. 5 is an enlarged perspective view showing part A of FIG. 3 when viewed in another direction.

As shown in FIGS. 1 to 5, the elevatable chamber according to the present disclosure includes a chamber body 100 configured to receive an object (not shown), a chamber frame 200 formed so as to enclose the chamber body 100, an air cylinder 300 configured to move a part of the chamber body 100 upwards and downwards, and a controller 400 configured to operate the air cylinder 300.

Here, the object may be a secondary battery, more specifically a cylindrical secondary battery having an electrolytic solution injected thereinto, but is not necessarily limited thereto, and the secondary battery is assumed to be received in the chamber body for convenience of description.

First, the chamber body 100 includes a lower body 110 and an upper body 120, wherein the lower body 110 may be configured in an approximately circular flat structure. The upper body 120 is located above the lower body 110 and is elevatable, and the overall shape of the upper body may be hollow hemispherical or hollow semi-elliptical.

Here, a fastening portion 121 is provided at an upper part of the outside of the upper body 120 so as to be fixed to or separated from a support plate 230. Specifically, the fastening portion 121 has a receiving recess 121' formed in a shape corresponding to a fastening member 231 of the support plate 230, which is formed in the shape of a flange, such that the fastening member 231 can be slidably inserted into the receiving recess (see FIG. 4).

A secondary battery to be impregnated with an electrolytic solution is received on an upper surface of the lower body 110, and since decompression and pressurization need to be alternately performed for rapid and even impregnation, it is preferable for the upper body 120 and the lower body 110 to have a structure in which the upper body and the lower body are airtight such that the upper body and the lower body can be isolated from the outside when the upper body and the lower body are brought into tight contact with each other and in which the upper body and the lower body are fastened to each other so as not to be separated from each other even when predetermined pressure is applied to the inside thereof. Of course, it is obvious that at least one of the lower body 110 and the upper body 120 is provided with a port configured to be opened or closed for decompression or pressurization.

The chamber frame 200 may include a vertical frame 210, a horizontal frame 220, a support plate 230, and a guide frame 240.

A pair of vertical frames 210 is located so as to face each other in the state in which the chamber body 100 is disposed therebetween, wherein two vertical frames 210 are disposed at each side surface so as to spaced apart from each other by a predetermined distance, and therefore four vertical frames 210 may be provided; however, the present disclosure is not limited thereto.

The horizontal frame 220 may be fixed to upper parts of the four vertical frames 210 and may be configured in an approximately quadrangular flat structure.

The support plate 230 is located between the horizontal frame 220 and the upper body 120, and is moved upwards and downwards by the operation of the air cylinder 300 while the upper body 120 is fixed and supported. Specifically, the support plate is configured in a flat structure similar to the horizontal frame 220, wherein a piston rod 350 is connected to the vicinity of each of edges of opposite sides that face each other, and the upper body 120 is connected to the vicinity of a bottom surface of the center thereof by the fastening member 231, which extends downwards.

When the piston rod 350 is moved downwards or upwards, therefore, the support plate 230 moves upwards or downwards with the upper body 120 in a suspended state.

The guide frame 240, which is configured to guide the support plate 230 for stable upward and downward movement, may be disposed so as to extend through the support plate 230 in a vertical direction. Specifically, a lower end of the guide frame 240 is located so as to face downwards such that the lower end is brought into tight contact with the ground, and the other end of the guide frame is located so as to be brought into tight contact with a bottom surface of the horizontal frame 220. The guide frame is approximately rod-shaped. Four guide frames extending through respective corners of the horizontal frame 220 may be provided, but the number of the guide frames may be increased or decreased as needed.

FIG. 6 is a sectional view of an air cylinder provided in the elevatable chamber according to the first embodiment. When describing the air cylinder with reference to FIGS. 1 and 6, the air cylinder 300 is located in the vicinity of the vertical frame 210, more specifically between the pair of guide frames 240, and it is preferable for one air cylinder to be installed at each edge of the support plate 230 so as to face each other in order to stably elevate the support plate 230.

The air cylinder 300 may include a cylindrical cylinder tube 310, a head cover 320, a rod cover 330, a piston 340, and a piston rod 350.

The head cover 320 is located so as to seal a head-side end of the cylinder tube 310 and is provided with a head-side port 321 configured to allow air to be introduced therethrough when the support plate 230 is moved upwards and to allow air to be exhausted therethrough when the support plate 230 is moved downwards, and a second air pipe connected to a supply flow sensor is fastened to the head-side port 321.

The rod cover 330 seals a rod shaft end of the cylinder tube 310, and is provided with a rod-side port 331 that remains open. The piston 340 divides the cylinder chamber in tight contact with an inner surface of the cylinder tube 310, and the piston rod 350 is disposed such that one side of the piston rod 350 is connected to the piston 340 and the other end of the piston rod is connected to the support plate 230. The air cylinder 300 is known, and therefore a more detailed description thereof will be omitted.

Next, a controller will be described. FIG. 7 is a perspective view of a controller provided in the elevatable chamber according to the first embodiment, FIG. 8 is a front view of the controller provided in the elevatable chamber according to the first embodiment, and FIG. 9 is an air circuit diagram for operation of an air cylinder according to a first embodiment.

The controller 400 controls the supply and exhaust of air to determine the operation of the air cylinder 300.

The controller 400 may include a main valve 410, a supply pressure control member 420, a first pressure sensor 430, a pilot valve 440, a supply flow sensor 450, an exhaust flow sensor 460, a second pressure sensor 470, and an exhaust pressure control member 480.

First, the main valve 410 is configured to control the supply of air from an air compressor (not shown), such as a compressor, and is provided at one side thereof with an air inlet port 411 for connection with a first air pipe L1 connected to the air compressor.

Based on the flow direction of air that is supplied, the supply pressure control member 420 is located in front of the main valve 410 and may be a regulator that functions to regulate the pressure of air that is supplied such that a predetermined pressure is transmitted to the air cylinder 300 when the air cylinder 300 is moved upwards.

The first pressure sensor 430 is located in front of the supply pressure control member 420 and measures the pressure of air passing through the supply pressure control member 420. Here, the first pressure sensor 430 is preferably provided with a first display portion 431 configured to allow the pressure measured in real time to be visually checked, and further preferably has a function to generate a warning signal, such as an alarm or warning light, when the pressure deviates from a predetermined pressure range or when the pressure is in an abnormal state for a certain period of time.

The pilot valve 440, which is constituted by a first pilot valve 441 and a second pilot valve 442, is located between the first pressure sensor 430, the exhaust flow sensor 460, and the second pressure sensor 470, i.e. on the route of air that is supplied and air that is exhausted, in order to switch the movement direction of air.

In particular, the pilot valve 440 is preferably an intermediate stop type solenoid valve having 3 ports and 3 ways, which is configured to prevent a constriction accident, etc. That is, when a value measured by one or more of the first pressure sensor 430, the supply flow sensor 450, the exhaust flow sensor 460, and the second pressure sensor 470 deviates from a predetermined range, the pilot valve blocks the supply or exhaust of air, thereby stopping the movement of the piston rod 350.

The supply flow sensor 450, which is a unidirectional flow sensor configured to measure the flow rate of air that has passed the first pressure sensor 430, measures the flow rate of air that has sequentially passed through the first pressure sensor 430, the pilot valve 440, and the exhaust flow sensor 460.

Preferably, the number of the supply flow sensors 450 is equal to the number of the head-side ports of the air cylinders. In the present disclosure, two air cylinders are provided and one head-side port is provided at each of the air cylinders, and therefore the supply flow sensor is constituted by the first supply flow sensor 451 and the second supply flow sensor 452 in order to supply air to each head-side port.

In addition, the first supply flow sensor 451 and the second supply flow sensor 452 are provided respectively with a first air entrance 451' and a second air entrance 452' so as to be connected to the head-side ports, and the first air entrance and the second air entrance are connected to each other via a second air pipe L2.

Here, the second air pipe L2 is also used as a path along which compressed air is exhausted when the air cylinder is moved downwards, which will be described later.

In the same manner as the first pressure sensor 430, each of the first supply flow sensor 451 and the second supply flow sensor 452 is preferably provided with a display window such that the flow rate of air that is supplied can be checked in real time, and further preferably has a function to generate a warning signal, such as an alarm or warning light, when the flow rate deviates from a predetermined flow rate range or when the flow rate is in an abnormal state for a certain period of time.

Next, the exhaust flow sensor 460 is a unidirectional flow sensor configured to measure the flow rate of air exhausted from the air cylinder, and is located between the supply flow sensor 450 and the pilot valve 440.

That is, when the upper body of the chamber body is moved downwards, the compressed air under the cylinder tube must be exhausted, and the exhausted air moves to the exhaust flow sensor 460 via the supply flow sensor 450.

In the same manner as the supply flow sensor 450, the exhaust flow sensor 460 preferably includes a first exhaust flow sensor 461 and a second exhaust flow sensor 462 in order to measure the flow rate of air exhausted from each head-side port.

Meanwhile, although not shown in the figures, the positions of the supply flow sensor 450 and the exhaust flow sensor 460 may be interchanged, and the supply flow sensor 450 and the exhaust flow sensor 460 may be connected to the pilot valve 440 in a parallel manner. In addition, a bidirectional flow sensor may simultaneously perform the functions of the supply flow sensor 450 and the exhaust flow sensor 460, and therefore the supply flow sensor and the exhaust flow sensor may be replaced by a single flow sensor.

The second pressure sensor 470 is configured to measure the pressure of air moved through the exhaust flow sensor 460, and measure the pressure of air in front of the exhaust flow sensor 460, more specifically the pressure of air that has sequentially passed through the exhaust flow sensor 460 and the pilot valve 440.

In the same manner as the first pressure sensor 430, the second pressure sensor 470 is preferably provided with a second display portion 471 such that the pressure of air that is exhausted can be checked in real time, and further preferably has a function to generate a warning signal, such as an alarm or warning light, when the pressure deviates from a predetermined pressure range or when the pressure is in an abnormal state for a certain period of time.

The exhaust pressure control member 480 is located at the rear of the second pressure sensor 470, and may be a relief valve that performs control such that the air in the cylinder tube is exhausted while being maintained at a predetermined pressure. In other words, the exhaust pressure control member controls the air pressure in the cylinder tube in order to limit abrupt downward movement of the chamber body, thereby preventing an unexpected accident that may occur when the upper body of the chamber body is moved downwards.

Although not shown in the figures, the controller 400 may be further provided with a case configured to receive the main valve 410, the supply pressure control member 420, the first pressure sensor 430, the pilot valve 440, the supply flow sensor 450, the exhaust flow sensor 460, the second pressure sensor 470, and the exhaust pressure control member 480 and a monitor configured to display various kinds of information, such as the pressure and the flow rate, in real time after the information is received such that an operator can remotely check and control the operating condition of an apparatus.

FIG. 10 is a front view of a controller provided in an elevatable chamber according to a second embodiment of the present disclosure, and FIG. 11 is an air circuit diagram for operation of an air cylinder according to a second embodiment of the present disclosure.

With the exception of the configuration related to an exhaust pressure control member 480, the chamber according to the second embodiment is identical in construction to the chamber according to the first embodiment described with reference to FIGS. 1 to 9, and therefore a duplicate description thereof will be omitted.

The exhaust pressure control member 480 according to the second embodiment may be a precision regulator having an inlet port through which air that has passed through a first air pipe L1 and a third air pipe L3 connected to an air compressor is supplied, a connection port communicating with a second pressure sensor 470, and an exhaust port through which air is exhausted.

If air leakage occurs due to a crack occurring at the rear of an exhaust pressure control member 480, i.e. the connection between a second air pipe, the second pressure sensor 470, and the exhaust pressure control member 480, the pressure at the exhaust pressure control member 480 may remain lower than a predetermined pressure, resulting in rapid downward movement of an upper body.

In a precision regulator constituting the exhaust pressure control member 480 according to the second embodiment, however, air having predetermined pressure is constantly supplied through the third air pipe L3 and the inlet port, whereby it is possible to maintain a constant pressure at the rear of the exhaust pressure control member 480 including the second air pipe.

Of course, under a normal condition, i.e. when the pressure of exhausted air moving to the exhaust pressure control member 480 via the second pressure sensor 470 is equal to or greater than the pressure set by the exhaust pressure control member 480, no air can move through a connection port.

Although FIGS. 10 and 11 show that air is supplied to the exhaust pressure control member 480 via the third air line L3 after diverging from the first air line L1, the air compressor and the third air line L3 may be directly connected to each other.

Meanwhile, the precision regulator having the function and the configuration described above is known as FESTO's LRP series and SMC's IR series, and therefore a detailed description thereof will be omitted.

FIG. 12 is a flowchart showing a method of operating the elevatable chamber according to each of the first and second embodiments of the present disclosure, FIG. 13 is a front view of the controller according to the first embodiment, illustrating the flow direction of air when the air is supplied to the air cylinder in a normal state, and FIG. 14 is a front view of the controller according to the first embodiment, illustrating the flow direction of air when the air is exhausted from the air cylinder in a normal state.

The method of operating the elevatable chamber will be described with reference to FIGS. 12 to 14 in conjunction with FIG. 1.

The method of operating the elevatable chamber according to the present disclosure includes a first step of supplying air to the air cylinder to move the upper body upwards, a second step of loading an object on the lower body, a third step of exhausting air compressed in the air cylinder to bring the upper body into tight contact with the top of the lower body, and a fourth step of pressurizing and decompressing a space portion formed as the result of tight contact between the lower body and the upper body.

In the first step, which is a step of moving the upper body 120 upwards in the state in which the upper body 120 is seated on the lower body 110, air is supplied to the air cylinder 300, whereby the piston and the piston rod are moved upwards, resulting in the upper body 120 being moved upwards.

At this time, the supplied air is supplied to the air cylinder 300 after sequentially passing through the main valve 410, the supply pressure control member 420, the first pressure sensor 430, the pilot valve 440, the exhaust flow sensor 460, and the supply flow sensor 450, as shown in FIG. 13, and the supply pressure of the air is controlled by the supply pressure control member 420.

Here, even though the supplied air passes through the exhaust flow sensor 460, only the path along which the supplied air moves is provided and the flow rate of the supplied air is not measured, since the exhaust flow sensor is a unidirectional flow sensor that can measure the flow rate of air only when the air is exhausted.

In addition, the pilot valve 440 communicates with the second pressure sensor 470, but the air is directed to the exhaust flow sensor 460 by port switching.

In the second step, the lower body 110 and the upper body 120 are spaced apart from each other by a predetermined distance, and an object, i.e. a cylindrical secondary battery having an electrolytic solution injected thereinto, is loaded.

In the third step, which is a step of bringing the lower body 110 and the upper body 120 into tight contact with each other to prevent contact with the outside, the air compressed in the air cylinder 300 is exhausted to move the upper body 120 downwards.

As shown in FIG. 14, the air compressed in the cylinder is exhausted to the outside after sequentially passing through the supply flow sensor 450, the exhaust flow sensor 460, the pilot valve 440, the second pressure sensor 470, and the exhaust pressure control member 480, and the pressure of the air in the cylinder 300 is regulated by the exhaust pressure control member 480.

Even though the exhausted air passes through the supply flow sensor 450, only the path along which the exhausted air moves is provided and the flow rate of the exhausted air is not measured, since the supply flow sensor is a unidirectional flow sensor that can measure the flow rate of air only when the air is supplied.

In addition, the pilot valve 440 also communicates with the first pressure sensor 430, but the air is directed to the second pressure sensor 470 by port switching.

Meanwhile, in order for the upper body to be completely moved downwards and to come into tight contact with the lower body, it is preferable to control the cylinder such that the pressure in the cylinder is maintained at a level that is lower within a certain range than the load of the upper body.

The final fourth step is a step of performing pressurization and decompression such that the secondary battery is well impregnated with the injected electrolytic solution.

FIG. 15 is a front view of the controller according to the first embodiment, illustrating the flow direction of air supplied to the air cylinder in an abnormal state. When an abnormal state is detected in the first step, i.e. in the process of supplying air to the air cylinder to move the upper body upwards, the flow of the air is blocked by the pilot valve 440, which is an intermediate stop type solenoid valve.

For example, when the weight of the upper body increases, such as due to an object being placed on the upper body or being held by an operator, the supply pressure or the supply flow rate may deviate from a predetermined supply pressure range or a predetermined supply flow rate range. When such a signal is transmitted to the pilot valve 440, port switching is performed such that the flow of air is blocked by the pilot valve 440, whereby no air is supplied to the air cylinder 300 and no air is exhausted from the air cylinder 300, i.e. the movement of air is completely stopped, and therefore the upper body is no longer moved upwards.

Of course, there may be a case in which the supply pressure or the supply flow rate is temporarily abnormal due to foreign matter stuck on the piston rod or guide frame, and therefore it is also possible to design such that a signal is transmitted to the pilot valve 440 only when the abnormal supply pressure or the abnormal supply flow rate continues for a certain period of time.

The above principle of operation may help prevent an accident, especially death or serious injury that may occur when the operator is caught between the upper body and the horizontal frame.

FIG. 16 is a front view of the controller according to the first embodiment, illustrating the flow direction of air exhausted from the air cylinder in an abnormal state. When an abnormal state is detected in the third step, i.e. in the process of exhausting the air compressed in the air cylinder to move the upper body downwards, the flow of the air is blocked by the pilot valve 440, which is an intermediate stop type solenoid valve.

For example, when there is an object or an operator on the lower body, the exhaust pressure or the exhaust flow rate may deviate from a predetermined exhaust pressure range or a predetermined exhaust flow rate range. When such a signal is transmitted to the pilot valve 440, port switching is performed such that the flow of air is blocked by the pilot valve 440, whereby no air is supplied to the air cylinder 300 and no air is exhausted from the air cylinder 300, i.e. the movement of air is completely stopped, and therefore the upper body is no longer moved downwards.

Of course, there may be a case in which the exhaust pressure or the exhaust flow rate is temporarily abnormal due to foreign matter stuck on the piston rod or guide frame, and therefore it is also possible to design such that a signal is transmitted to the pilot valve 440 only when the abnormal exhaust pressure or the abnormal exhaust flow rate continues for a certain period of time.

The above principle of operation may help prevent an accident, especially death or serious injury that may occur when the operator is caught between the lower body and the upper body.

FIG. 17 is a front view of a controller according to a second embodiment, illustrating the flow direction of air when the air is supplied to the air cylinder in a normal state. Air is supplied to the air cylinder 300 after sequentially passing through the first air pipe L1, the main valve 410, the supply pressure control member 420, the first pressure sensor 430, the pilot valve 440, the exhaust flow sensor 460, and the supply flow sensor 450, and the supply pressure of the air is controlled by the supply pressure control member 420.

Even though the supplied air passes through the exhaust flow sensor 460, only the path along which the supplied air moves is provided and the flow rate of the supplied air is not measured, since the exhaust flow sensor is a unidirectional flow sensor that can measure the flow rate of air only when the air is exhausted.

In addition, the pilot valve 440 communicates with the second pressure sensor 470, but the air is directed to the exhaust flow sensor 460 by port switching.

FIG. 18 is a front view of the controller according to the second embodiment, illustrating the flow direction of air when the air is exhausted from the air cylinder in a normal state.

The air compressed in the cylinder is exhausted to the outside after sequentially passing through the supply flow sensor 450, the exhaust flow sensor 460, the pilot valve 440, the second pressure sensor 470, and the exhaust pressure control member 480, and the pressure of the air in the cylinder 300 is regulated by the exhaust pressure control member 480.

At this time, the air from the first air pipe L1 is directed toward the exhaust pressure control member 480, but is not introduced into the exhaust pressure control member 480, since the pressure of the air exhausted from the second pressure sensor 470 is sufficiently high.

Even though the exhausted air passes through the supply flow sensor 450, only the path along which the exhausted air moves is provided and the flow rate of the exhausted air is not measured, since the supply flow sensor is a unidirectional flow sensor that can measure the flow rate of air only when the air is supplied.

In addition, the pilot valve 440 also communicates with the first pressure sensor 430, but the air is directed to the second pressure sensor 470 by port switching.

FIG. 19 is a front view of the controller according to the second embodiment, illustrating the flow direction of air exhausted from the air cylinder in an abnormal state.

In a normal state, the air compressed in the cylinder is exhausted to the outside after sequentially passing through the supply flow sensor 450, the exhaust flow sensor 460, the pilot valve 440, the second pressure sensor 470, and the exhaust pressure control member 480.

In an abnormal condition in which air leakage occurs at the rear of the exhaust pressure control member 480, however, the pressure of the air directed to the exhaust pressure control member 480 after passing through the second pressure sensor 470 is maintained lower than a predetermined pressure. In this case, the air from the first air pipe L1 moves toward the exhaust pressure control member 480 for air replenishment, whereby it is possible to adjust the downward movement speed of the upper body.

Of course, when air leakage occurring at the rear of the exhaust pressure control member 480 is serious, the air introduced from the first air line L1 may move toward the second pressure valve 470, the exhaust flow sensor 460, and the supply flow sensor 450.

Meanwhile, in the abnormal state of the first embodiment described with reference to FIG. 16, i.e. when there is an object or an operator on the lower body in the process of exhausting the air compressed in the air cylinder to move the upper body downwards, the flow of air is blocked by the pilot valve 440, which is an intermediate stop type solenoid valve, even in the second embodiment.

Of course, in the event of mechanical or control abnormality of the pilot valve 440, operation is performed as shown in FIG. 19.

Those skilled in the art to which the present disclosure pertains will appreciate that various applications and modifications are possible within the category of the present disclosure based on the above description.

DESCRIPTION OF REFERENCE NUMERALS

100: Chamber body
110: Lower body
120: Upper body
121: Fastening portion 121': Receiving recess
200: Chamber frame
210: Vertical frame
220: Horizontal frame
230: Support plate 231: Fastening member
240: Guide frame
300: Air cylinder
310: Cylinder tube
320: Head cover 321: Head-side port
330: Rod cover 331: Rod-side port
340: Piston
350: Piston rod
400: Controller
410: Main valve 411: Air inlet port
420: Supply pressure control member
430: First pressure sensor 431: First display portion
440: Pilot valve
441: First pilot valve 442: Second pilot valve
450: Supply flow sensor
451: First supply flow sensor 451': First air entrance
452: Second supply flow sensor 452': Second air entrance
460: Exhaust flow sensor
461: First exhaust flow sensor 462: Second exhaust flow sensor
470: Second pressure sensor 471: Second display portion
480: Exhaust pressure control member
L1: First air pipe
L2: Second air pipe
L3: Third air pipe
V: Directional control valve

The invention claimed is:
1. An elevatable chamber comprising:
a chamber body constituted by a lower body and an upper body located above the lower body;
a chamber frame comprising a pair of vertical frames located so as to face each other with the chamber body disposed therebetween, a horizontal frame connecting upper parts of the pair of vertical frames to each other, and a support plate located under the horizontal frame and configured to move upwards and downwards with the upper body fastened thereto;

an air cylinder comprising a cylinder tube having a cylindrical shape located in the vicinity of each of the pair of vertical frames, a head cover configured to seal a head-side end of the cylinder tube and having a head-side port configured to allow air to be introduced therethrough when the support plate is moved upwards and to allow air to be exhausted therethrough when the support plate is moved downwards, a rod cover configured to seal a rod shaft end of the cylinder tube and having a rod-side port configured to remain open, a piston configured to divide a cylinder chamber of the cylinder tube, and a piston rod having one side connected to the piston and the other end connected to the support plate; and a controller comprising a supply pressure control member configured to supply air to the cylinder tube such that the support plate is moved upwards, a first pressure sensor located in front of the supply pressure control member, a pair of supply flow sensors located in front of the first pressure sensor, a pair of exhaust flow sensors configured to exhaust air from the cylinder tube when the support plate is moved downwards, a second pressure sensor located in front of the exhaust flow sensors, and an exhaust pressure control member located in front of the second pressure sensor, wherein the exhaust pressure control member performs control such that air in the cylinder tube is exhausted while being maintained at a predetermined pressure.

2. The elevatable chamber according to claim 1, wherein the exhaust pressure control member is a regulator having an inlet port configured to allow air to be supplied therethrough, a connection port configured to communicate with the second pressure sensor, and an exhaust port configured to allow air to be exhausted therethrough.

3. The elevatable chamber according to claim 1, wherein the exhaust pressure control member is a relief valve.

4. The elevatable chamber according to claim 1, wherein the elevatable chamber further comprises a pilot valve configured to block a supply or exhaust of air, thereby stopping movement of the piston rod, when a value measured by one or more of the first pressure sensor, the supply flow sensor, the exhaust flow sensor, and the second pressure sensor deviates from a predetermined range.

5. The elevatable chamber according to claim 1, wherein a main valve having an air inlet port configured to allow air to be supplied therethrough is connected to a rear of the supply pressure control member.

6. The elevatable chamber according to claim 1, wherein:
the exhaust flow sensor is located between the first pressure sensor and the supply flow sensor, and
each of the supply flow sensor and the exhaust flow sensor is a unidirectional flow sensor such that the supply flow sensor senses a flow rate of air when the air is supplied while the exhaust flow sensor senses a flow rate of air when the air is exhausted.

7. The elevatable chamber according to claim 6, wherein the exhaust flow sensor is located between the second pressure sensor and the supply flow sensor.

8. The elevatable chamber according to claim 7, wherein a pilot valve configured to switch a movement direction of air is provided between the first pressure sensor, the exhaust flow sensor, and the second pressure sensor.

9. The elevatable chamber according to claim 8, wherein the pilot valve is an intermediate stop type solenoid valve configured to block a supply or exhaust of air, thereby stopping movement of the piston rod, when a value measured by one or more of the first pressure sensor, the supply flow sensor, the exhaust flow sensor, and the second pressure sensor deviates from a predetermined range.

10. The elevatable chamber according to claim 9, wherein, when the value measured by the one or more of the first pressure sensor, the supply flow sensor, the exhaust flow sensor, and the second pressure sensor deviates from the predetermined range and is maintained for a certain period of time, the supply or exhaust of air is blocked, whereby the movement of the piston rod is stopped.

11. The elevatable chamber according to claim 1, wherein the elevatable chamber further comprises a warning member configured to inform of an abnormal state when a value measured by one or more of the first pressure sensor, the supply flow sensor, the exhaust flow sensor, and the second pressure sensor deviates from a predetermined range.

12. The elevatable chamber according to claim 1, wherein:
the upper body is hemispherical or semi-elliptical in shape, and
the lower body and the upper body are hermetically sealed when being brought into tight contact with each other.

13. The elevatable chamber according to claim 12, wherein the chamber body is configured to impregnate a secondary battery with an electrolytic solution injected thereinto.

14. A method of operating an elevatable chamber, the method comprising:
a first step of supplying air to an air cylinder to move an upper body upwards;
a second step of loading an object on a lower body;
a third step of exhausting air compressed in the air cylinder to bring the upper body into tight contact with a top of the lower body; and
a fourth step of pressurizing and decompressing a space portion formed as a result of tight contact between the lower body and the upper body, wherein
in the third step, control is performed such that the compressed air is exhausted while being maintained at a predetermined pressure.

15. The method according to claim 14, wherein, when one or more of a supply flow rate of air or a supply pressure of air in the first step, or an exhaust flow rate of air or an exhaust pressure of air in the third step deviates from a predetermined range, a supply or exhaust of air is blocked, whereby an operation of the air cylinder is stopped.

* * * * *